United States Patent
Dewa et al.

(10) Patent No.: US 9,735,594 B2
(45) Date of Patent: Aug. 15, 2017

(54) CHARGING/DISCHARGING DEVICE

(71) Applicants: KABUSHIKI KAISHA NIHON MICRONICS, Tokyo (JP); GUALA TECHNOLOGY CO., LTD., Hyogo-Ken (JP)

(72) Inventors: Harutada Dewa, Tokyo (JP); Kiyoyasu Hiwada, Tokyo (JP); Tomokazu Saito, Tokyo (JP); Kazuyuki Tsunokuni, Tokyo (JP); Akira Nakazawa, Hyogo-Ken (JP)

(73) Assignees: KABUSHIKI KAISHA NIHON MICRONICS, Tokyo (JP); GUALA TECHNOLOGY CO., LTD., Hyogo-Ken (JP)

( * ) Notice: Subject to any disclaimer, the term of this patent is extended or adjusted under 35 U.S.C. 154(b) by 381 days.

(21) Appl. No.: 14/414,739

(22) PCT Filed: Jul. 23, 2013

(86) PCT No.: PCT/JP2013/069864
§ 371 (c)(1),
(2) Date: Jan. 14, 2015

(87) PCT Pub. No.: WO2014/017463
PCT Pub. Date: Jan. 30, 2014

(65) Prior Publication Data
US 2015/0188337 A1    Jul. 2, 2015

(30) Foreign Application Priority Data
Jul. 24, 2012  (WO) ................. PCT/JP2012/068678

(51) Int. Cl.
*H02J 7/00*     (2006.01)
*H01M 10/44*    (2006.01)
*H01M 10/0525*  (2010.01)

(52) U.S. Cl.
CPC ....... *H02J 7/0024* (2013.01); *H01M 10/0525* (2013.01); *H01M 10/441* (2013.01)

(58) Field of Classification Search
CPC .................................................... Y02E 60/12
(Continued)

(56) References Cited

U.S. PATENT DOCUMENTS 5,499,294 A    3/1996   Friedman
5,799,082 A    8/1998   Murphy et al.
(Continued)

FOREIGN PATENT DOCUMENTS

JP    2002-208440    7/2002
JP    2005-295694    10/2005
(Continued)

OTHER PUBLICATIONS

Evidence Pix Company Information, http://www.evidencepix.com/company.html (Dec. 2012).
(Continued)

*Primary Examiner* — Yalkew Fantu
(74) *Attorney, Agent, or Firm* — Bacon & Thomas, PLLC

(57) ABSTRACT

A charging/discharging device performs charging and discharging on a plurality of secondary cells concurrently in parallel, without adopting a power source having an extremely high current supply capacity. A plurality of switching units controlled by a switching control unit are interposed respectively between the secondary cells and each of a plurality of charging power lines and discharging power lines. A power unit applies voltages having mutually-different voltage values and the switching control unit controls switching so that the respective secondary cells are connected cyclically in predetermined order to the charging and discharge power lines.

19 Claims, 21 Drawing Sheets

(58) Field of Classification Search
USPC .......................................................... 320/112
See application file for complete search history.

(56) References Cited

U.S. PATENT DOCUMENTS

| | | | |
|---|---|---|---|
| 5,862,218 A | 1/1999 | Steinberg | |
| 6,005,936 A | 12/1999 | Shimizu et al. | |
| 6,346,794 B1* | 2/2002 | Odaohhara | H02J 7/0013 320/116 |
| 6,711,004 B2* | 3/2004 | Yen | G06F 1/1618 312/223.1 |
| 7,146,479 B2 | 12/2006 | Li et al. | |
| 7,161,479 B2 | 1/2007 | Sobol | |
| 7,207,480 B1 | 4/2007 | Geddes | |
| 7,535,352 B2 | 5/2009 | Sobol | |
| 7,538,519 B2* | 5/2009 | Daou | H02J 7/0031 320/116 |
| 7,592,815 B2* | 9/2009 | Yano | B60L 3/0046 320/116 |
| 8,107,668 B2 | 1/2012 | Lowe et al. | |
| 2005/0225289 A1* | 10/2005 | Iida | H01M 10/441 320/116 |
| 2009/0200987 A1 | 8/2009 | Saito et al. | |
| 2010/0067089 A1 | 3/2010 | Nakazawa | |
| 2013/0009485 A1 | 1/2013 | Sakuma et al. | |

FOREIGN PATENT DOCUMENTS

| | | |
|---|---|---|
| JP | 2005-295694 A | 10/2005 |
| JP | 2009-191587 A | 9/2009 |
| JP | 2009-197587 | 9/2009 |
| JP | 2010-287512 | 12/2010 |
| JP | 2012 186989 A | 9/2012 |
| TW | 2010-44742 A | 12/2010 |
| WO | WO0251126 A2 | 6/2002 |
| WO | WO2007/105612 A1 | 9/2007 |
| WO | WO2007-105612 A1 | 9/2007 |
| WO | WO2008 053561 A1 | 5/2008 |
| WO | WO2009-129041 A1 | 10/2009 |
| WO | WO2011/135891 A1 | 11/2011 |
| WO | WO2011-135891 A1 | 11/2011 |
| WO | WO2012162467 A1 | 11/2012 |

OTHER PUBLICATIONS

Supplementary Extended Search Report Issued on Dec. 4, 2015 in Corresponding European Patent Application No. 13823893.6.

* cited by examiner

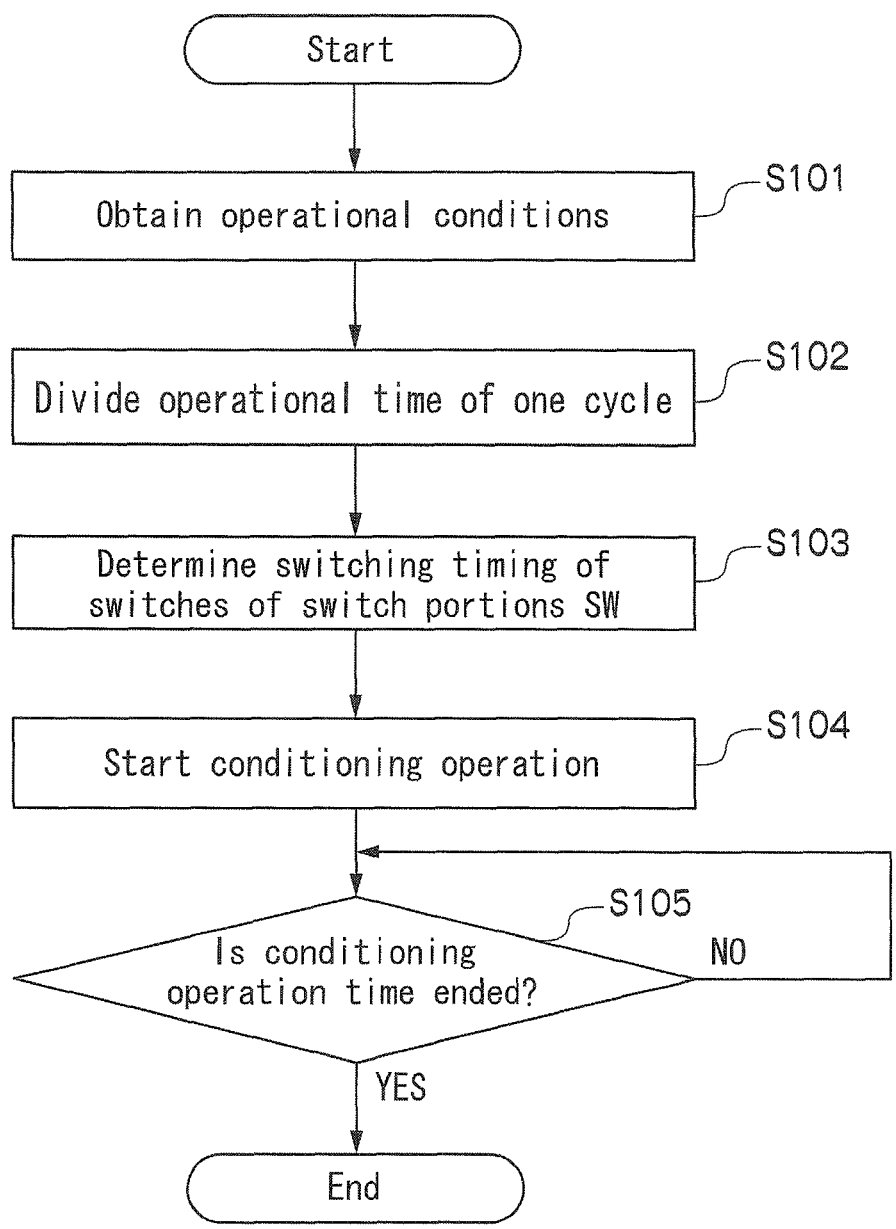

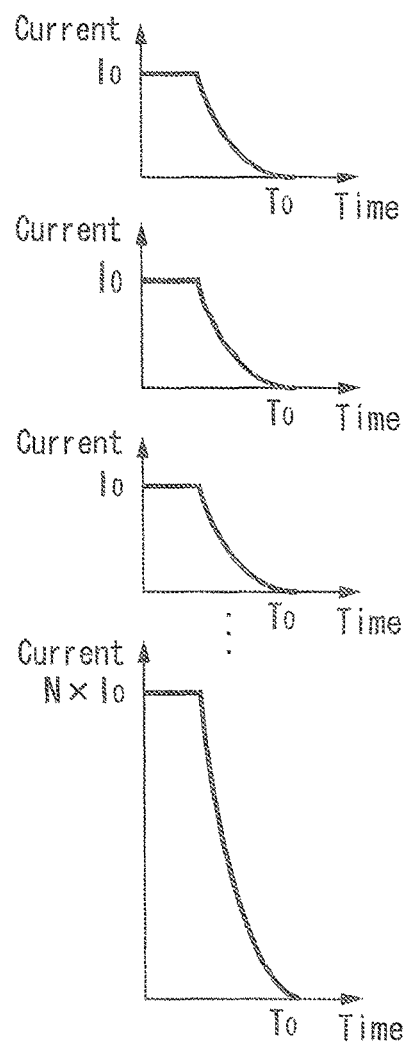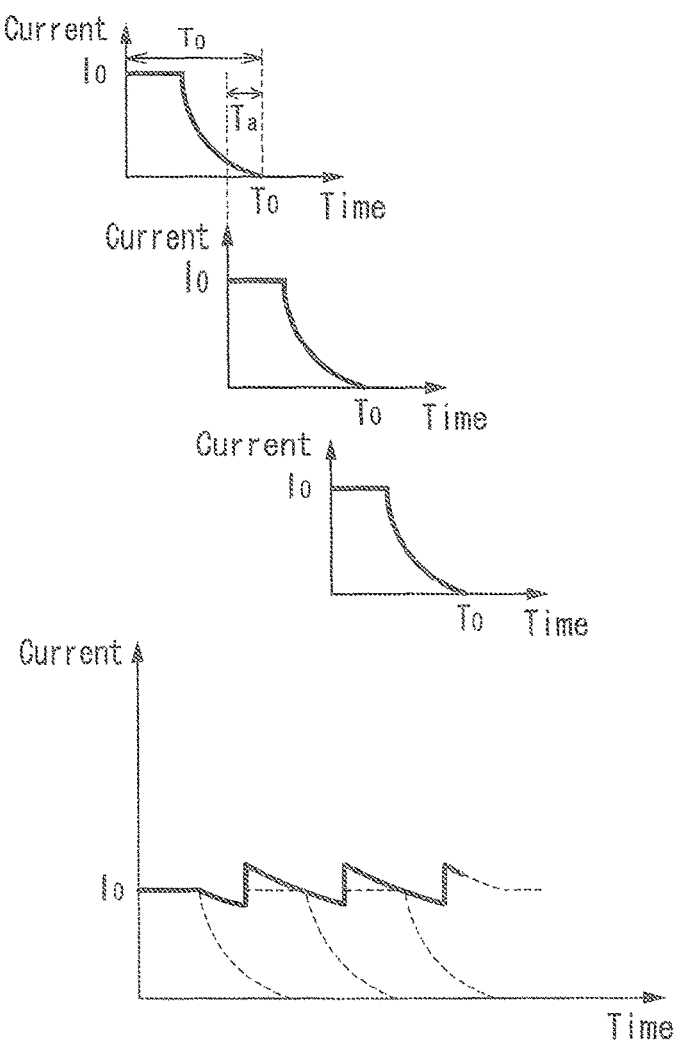
FIG.20A                    FIG.20B ly performs operation illustrated in FIG. 3(A).

CHARGING/DISCHARGING DEVICE

TECHNICAL FIELD

The present invention relates to a charging/discharging device, and for example, relates to a charging/discharging device which causes a plurality of charge/discharge members to perform charge/discharge operation concurrently in parallel.

BACKGROUND ART

For example, there have been power devices to perform charge/discharge operation of a secondary cell, storing of charges to a capacitor or the like and discharging thereof, or power supplying to electrical equipment and power consuming for performing equipment operation. In the following description, a power device to perform power supplying and power consuming as described above is denoted as a charging/discharging device. Further, an object on which the charging/discharging device performs power supplying and power consuming is denoted as a charge/discharge member.

For example, when the abovementioned charging/discharging device is used as a charging/discharging device for a secondary cell, the charging/discharging device repeatedly performs charge operation to apply a charging voltage to a secondary cell for a predetermined time and discharge operation to absorb discharge electric power from the charged secondary cell for a predetermined time.

Thus, when the abovementioned charging/discharging device is used as a power device to cause a secondary cell to perform charge/discharge operation, the charging/discharging device can be used, for example, as a conditioning device to activate cell performance of a secondary cell, an aging device to repeatedly perform charge/discharge operation until a secondary cell obtains predetermined cell performance, a charge/discharge testing device for a secondary cell, a cycle testing device to examine temporal charge/discharge cycle performance of a secondary cell, and the like (see Patent Document 1 and Patent Document 2).

Here, operation in a case that a charging/discharging device is used as a conditioning device for a secondary cell is briefly described as an example using FIGS. 2 and 3. FIGS. 2 and 3 illustrate a case that the charging/discharging device is used as a conditioning device for a secondary cell which is a later-mentioned quantum cell.

As illustrated in FIG. 2, in a charging/discharging device 100A, a power source 103 outputs drive current to a power amplifier 101 and the power amplifier 101 applies a voltage having a predetermined waveform to a secondary cell 104 based on the drive current from the power source 103.

As illustrated in FIG. 3(A), for charging the secondary cell 104 being a quantum cell, the power amplifier 101 applies a voltage $V_1$ higher than a charging voltage $V_2$ instantly for a time $T_1$ to activate the secondary cell 104, and then, applies the charging voltage $V_2$ to the secondary cell 104 for a predetermined time $T_2$. Further, for discharging the secondary cell 104, the power amplifier 101 applies a voltage $V_3$ lower than a discharging voltage $V_4$ instantly for a time $T_3$ to activate the secondary cell 104, and then applies the charging voltage $V_4$ to the secondary cell 104 for a predetermined time $T_4$. In charge/discharge operation for the secondary cell 104, the charging/discharging device 100A repeatedly performs operation illustrated in FIG. 3(A).

Further, operation in a case that a charging/discharging device is used as a charge/discharge testing device for a secondary cell is briefly described as an example using FIG. 4.

The charging/discharging device illustrated in FIG. 4 adopts a constant-current constant-voltage (CC-CV) charging method for charging a secondary cell. In the CC-CV charging method, charging is started with constant current (CC) to avoid overvoltage, and is switched to a constant voltage (CV) when a voltage of the secondary cell reaches a predetermined voltage. Here, discharging is performed with constant current (CC) when the charging/discharging device absorbs discharge of the secondary cell.

Here, the charging/discharging method of a secondary cell is not limited to the CC-CV charging method and the CC discharging method in FIG. 4. Aside from the CC-CV charging method, it is also possible to adopt a CC charging method, a CV charging method, or the like as the charging method. Further, aside from the CC discharging method, it is also possible to adopt a discharging method with resistance load (R discharging method), or the like as the discharging method.

Further, as described above, the charging/discharging device can be used as an aging device for a secondary cell, a cycle testing device for a secondary cell, and the like.

Further, in a case that a plurality of secondary cells are caused to perform charge/discharge operation (e.g., conditioning) concurrently in parallel, as illustrated in FIG. 5, a charging/discharging device 100B includes a required number (N pieces in FIG. 5) of power amplifiers 101 and each power amplifier 101 performs charge/discharge operation on a corresponding secondary cell 104 concurrently in parallel.

CITED DOCUMENT

Patent Document

Patent Document 1: Japanese Patent Application Laid-Open No. 2002-208440
Patent Document 2: Japanese Patent Application Laid-Open No. 2010-287512

SUMMARY OF THE INVENTION

When a plurality of secondary cells are caused to perform charge/discharge operation concurrently in parallel, current peaks overlap in timing. Accordingly, it is required to arrange an expensive power source having a high current supply capacity.

For example, in a case that the charging/discharging device 100A performs charge/discharge operation on one secondary cell 104 as illustrated in FIGS. 2 and 3, the power source 103 is required to have a current supply capacity corresponding to a current peak value $I_1$ at the plus side and a current supply capacity corresponding to a current peak value $I_3$ at the minus side as illustrated in FIG. 3(B). Further, as illustrated in FIG. 5, with a structure that electric power is supplied to the secondary cells 104 through a plurality of channels as arranging the plurality of power amplifiers 101, it may be possible to adopt a method to supply electric power to the respective channels with voltage waveforms of the plurality of power amplifiers 101 shifted. However, in such a case, the number of structural elements for adjusting voltage waveforms is increased due to increase of the number of channels, causing a problem to increase device cost.

Meanwhile, in a case that the charging/discharging device 1005 causes N pieces of secondary cells 104 to perform charge/discharge operation concurrently in parallel, as illustrated in FIG. 6, the power source 103 is required to have a current supply capacity corresponding to a current peak value $N \times I_1$ at the plus side and a current supply capacity corresponding to a current peak value $N \times I_3$ at the minus side. For example, in a case that 20 pieces of secondary cells are caused to perform charge/discharge operation concurrently in parallel under conditions that each current peak value at the plus side is 0.4 A at maximum and each current peak value at the minus side is 1.4 A at maximum, the power source 103 is required to have a current supply capacity being 8 A at maximum at the plus side and 28 A at maximum at the minus side.

Further, for example, in a case that the charging/discharging device performs charge/discharge operation in FIG. 4 on N pieces of secondary cells concurrently in parallel, the power source is required to have a current supply capacity corresponding to $N \times I_0$ under conditions that I is smaller than $T_0$ for performing charge operation with the CC-CV charging method and a current supply capacity corresponding to $N \times I_d$ for performing discharge operation with the CC discharging method.

Further, as a charging/discharging device 100C in FIG. 7, it is also possible that one power amplifier 101 performs charge/discharge operation (e.g., conditioning) on a plurality of secondary cells 104. However, in such a case, when one secondary cell 104 fails during operation, the charge/discharge operation may not be performed properly on the rest of secondary cells 104 connected to the failed secondary cell 104.

Not limited to a case that the charging/discharging device is used as a conditioning device for a secondary cell, the abovementioned problems may occur commonly in cases of being used as an aging device for a secondary cell, a charge/discharge testing device for a secondary cell, a cycle testing device for a secondary cell, and the like.

Further, aside from a case that the charging/discharging device is used for charge/discharge operation of a secondary cell, the similar problems may occur in cases of being used as a power device to perform charging and discharging of a capacitor or the like or to perform power supplying to electric equipment and power consuming.

According to the above, there has been a requirement for a charging/discharging device capable of causing a plurality of charge/discharge members to perform charge/discharge operation concurrently in parallel without adopting a power source having an extremely high current supply capacity.

To solve such problems, according to a first aspect of the present invention, a charging/discharging device which causes a plurality of charge/discharge members to perform, concurrently in parallel, charge operation and discharge operation includes (1) a power unit; (2) a plurality of power lines for charging to provide, to the plurality of charge/discharge members, electric power supplied from the power unit; (3) a plurality of power lines for discharging to provide, to the power unit, electric power discharged from the plurality of charge/discharge members, the power unit applying voltages having a plurality of mutually-different voltage values via the plurality of power lines for charging and the plurality of power lines for discharging; (4) a plurality of connection switching units which switch connection of the plurality of charge/discharge members with the power lines for charging and the power lines for discharging as being interposed respectively between the plurality of charge/discharge members and each of the power lines for charging and the power lines for discharging; and (5) a switching control unit which controls switching of connection of the plurality of connection switching units so that the respective charge/discharge members are connected cyclically in predetermined order to the plurality of power lines for charging and the plurality of power lines for discharging.

According to a second aspect of the present invention, a charging/discharging device which performs, concurrently in parallel, charge operation and discharge operation on a plurality of charge/discharge members includes (1) a power line group including a power line for charging and a power line for discharging connected to a power unit which supplies electric power having a plurality of mutually different values; (2) a plurality of connection switching units which connect the power line group to the respective charge/discharge members for each charge/discharge member; and (3) a switching control unit which controls switching of the plurality of connection switching units so that maximum electric power values of charge electric power supplied to the respective charge/discharge members via the power line for charging and maximum electric power values of discharge electric power supplied to the respective charge/discharge members via the power line for discharging are not temporally overlapped among a part or all of the plurality of charge/discharge members.

According to a third aspect of the present invention, a charging/discharging device which performs, concurrently in parallel, charge operation and discharge operation on a plurality of charge/discharge members includes (1) a power line group including a power line for charging connected to a power unit and a power line for discharging connected to a loading unit; (2) a plurality of connection switching units which connect the power line group to the respective charge/discharge members for each charge/discharge member; and (3) a switching control unit which controls switching of the plurality of connection switching units so that maximum electric power values of charge electric power supplied to the respective charge/discharge members via the power line for charging and maximum electric power values of discharge electric power from the respective charge/discharge members via the power line for discharging are not temporally overlapped among a part or all of the plurality of charge/discharge members.

According to the present invention, it is possible to cause a plurality of charge/discharge members to perform charge/discharge operation concurrently in parallel without using a power source having a high current supply capacity.

BRIEF DESCRIPTION OF THE DRAWINGS

FIG. 10 is a flowchart illustrating operation of a conditioning process on quantum cells to be performed by the conditioning device of the first embodiment.

FIG. 20 is a view for comparing charge operation with the charge/discharge testing device of the second embodiment to conventional charge operation.

EMBODIMENTS OF THE INVENTION (A) Quantum Cell

Embodiments described in the following exemplify a case that a charging/discharging device of the present invention causes a plurality of secondary cells to perform charge/discharge operation concurrently in parallel.

The secondary cell caused to perform charge/discharge operation can be applied widely to a lithium ion secondary cell, an all-solid lithium ion cell whose electrolyte is formed in solid, a quantum cell, and the like. Here, the embodiments exemplify a case that a quantum cell is adopted as an example of a secondary cell. In the following, brief description will be provided on a quantum cell with reference to the drawings before describing the respective embodiments.

A quantum cell is a secondary cell based on an operational principal of forming a new energy level in a band gap and capturing an electron by utilizing a photoexcited structural change of a metal oxide.

Figure 8:
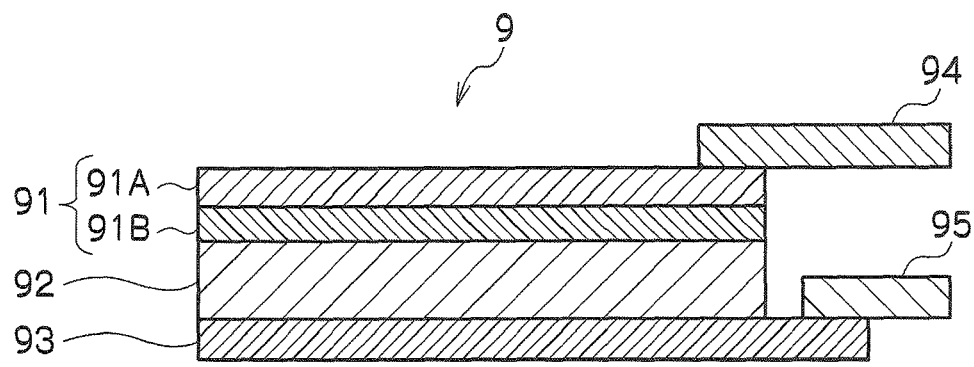
FIG. 8 is a sectional view illustrating a structure of a quantum cell in the embodiment.

The quantum cell is an all-solid-state secondary cell. FIG. 8 illustrates a structure capable of solely functioning as a secondary cell. As illustrated in FIG. 8, a quantum cell 9 has a solid charging layer 92 between a negative electrode layer 93 and a positive electrode layer 91. FIG. 8 illustrates a state that a positive electrode terminal 94 and a negative electrode terminal 95 are attached to the positive electrode layer 91 and the negative electrode layer 93, respectively.

The charging layer 92 is a layer to store electrons with charge operation, to release the charged electrons with discharge operation, and to keep the electrons (perform storage of electricity) in a state without charging/discharging. The charging layer 92 is formed by applying a photoexcited structural change technology.

The photoexcited structural change is described, for example, in International Patent Application Laid-open No. WO/2008/053561 and is a phenomenon (technology) found by Akira Nakazawa, who is an inventor of the above application. That is, Akira Nakazawa found out that, when effective excitation energy is applied to an insulation-coated translucent metal oxide which is a semiconductor having a band gap at a predetermined value or higher, a number of energy levels with no electron are generated in the band gap. The quantum cell 9 is charged by being caused to capture electrons in these energy levels and discharged by being caused to release the captured electrons.

The charging layer 92 is formed in a way where insulation-coated n-type metal oxide semiconductor particles adhere to the negative electrode layer 93 in a thin film shape and is transformed to be capable of storing electrons with a photoexcited structural change caused at the n-type metal oxide semiconductor by ultraviolet irradiation.

In the quantum cell 9, the positive electrode layer 91 includes an electrode main body layer 91A and a p-type metal oxide semiconductor layer 91B formed to be in contact with the charging layer 92. The p-type metal oxide semiconductor layer 91B is arranged so that electrons are prevented from being injected from the electrode main body layer 91A to the charging layer 92.

The negative electrode layer 93 and the electrode main body layer 91A of the positive electrode layer 91 are simply required to be formed as conductive layers.

A structure performing a function of a secondary cell as including the positive electrode layer 91, the charging layer 92, and the negative electrode layer 93 as illustrated in FIG. 8 is denoted as a single-layer. The quantum cell 9 may be formed of a single-layer or formed by layering a plurality of single-layers. The shape of the quantum cell 9 is not specifically limited. For example, it is also possible to have another shape such as a rectangular, a circle, an ellipse, a hexagon, or the like. Further, area (size) of the quantum cell 9 is not specifically limited as well. Further, the positive electrode layer 91 and the negative electrode layer 93 of the quantum cell 9 may have a thickness approximately in a range between 10 nm and 1 μm and the charging layer 92 may have a thickness approximately in a range between 50 nm and 10 μm.

(B) First Embodiment

In the following, a first embodiment of a charging/discharging device of the present invention will be described in detail with reference to the drawings.

The first embodiment exemplifies a case that a charging/discharging device of the present invention is applied to a conditioning device which performs conditioning on a plurality of quantum cells concurrently in parallel.

(B-1) Structure of First Embodiment

Figure 1:
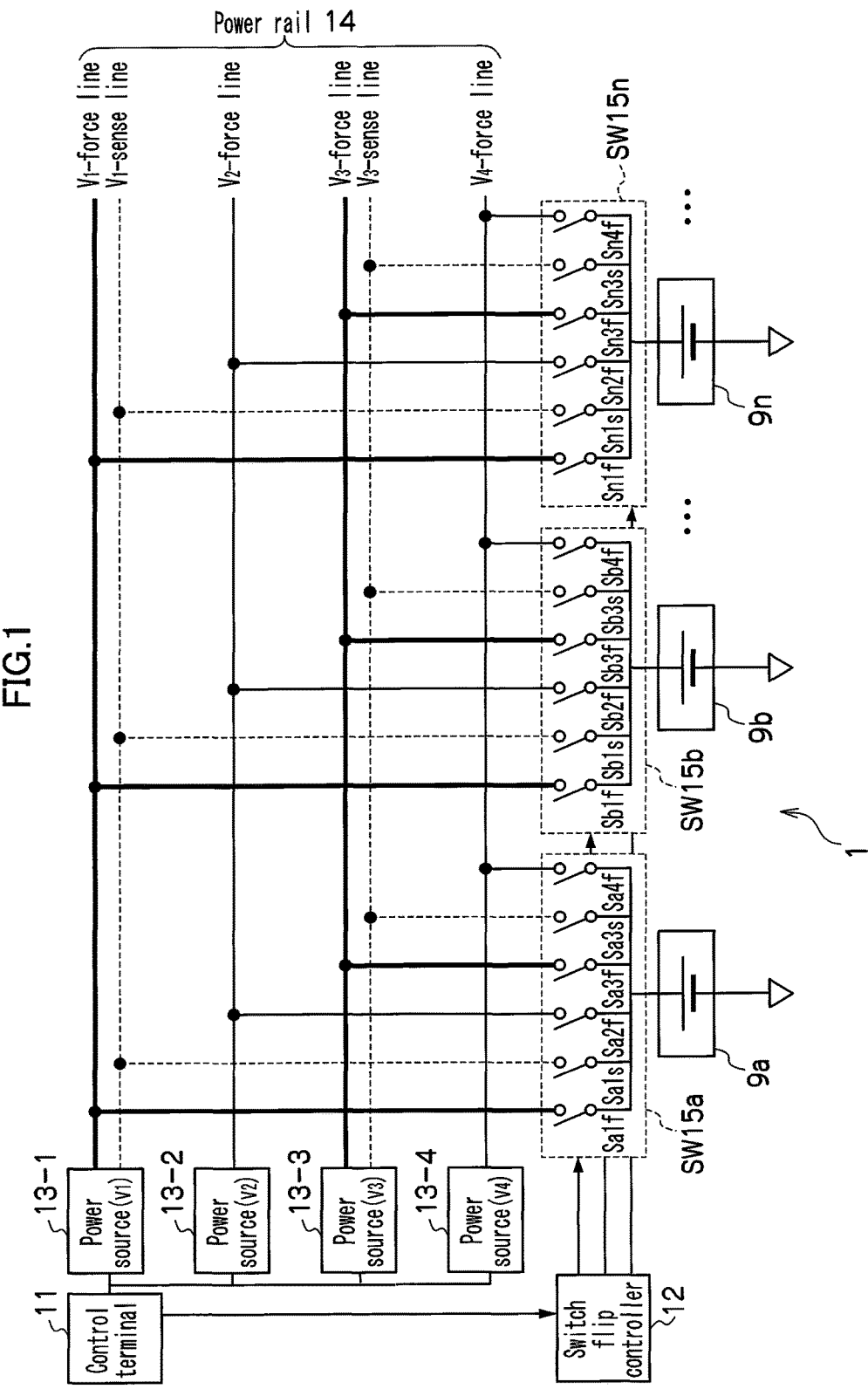
FIG. 1 is a structural view illustrating a structure of a conditioning device of a first embodiment.
Figure 2:
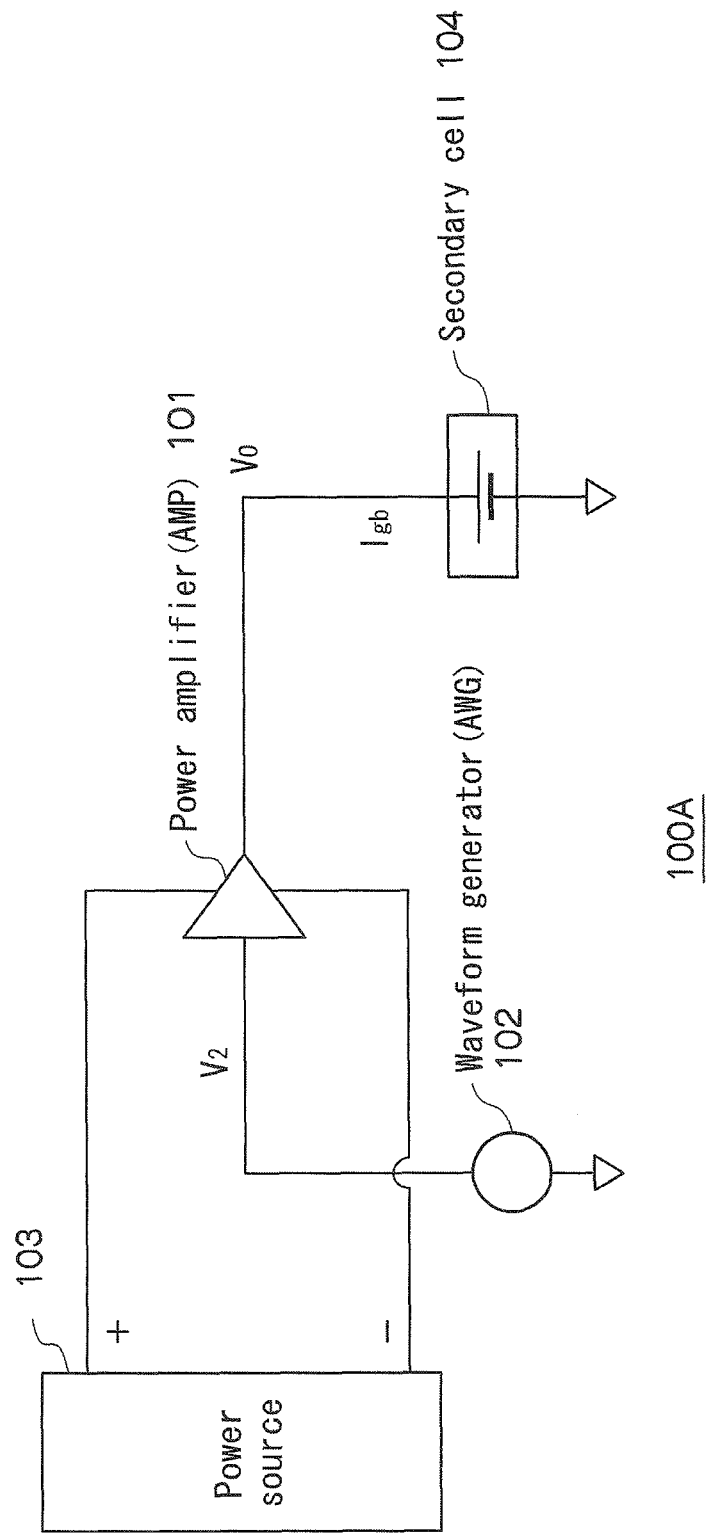
FIG. 2 is a structural view illustrating a conventional structure of a conditioning device which performs conditioning of a secondary cell.

FIG. 1 is a structural view illustrating a structure of a conditioning device of the first embodiment.

In FIG. 1, a conditioning device 1 of the first embodiment includes a control terminal 11, a switch flip controller 12, power sources 13-1 to 13-4, a power rail 14, and switch portions SW15a to SW15n.

Here, a power line group described in claims corresponds to a power rail described below in first and second embodiments. In the following, the power rail 14 is illustrated for convenience of explanation.

The conditioning device 1 is a device to perform conditioning on a plurality of quantum cells 9 (9a to 9n). The number of cells (quantum cells) on which conditioning is performed by the conditioning device 1 is not specifically limited. FIG. 1 illustrates an example of a case that the conditioning device 1 performs conditioning on the quantum cells 9a to 9n concurrently in parallel.

The power sources 13-1 to 13-4 are connected respectively to power lines (hereinafter, called voltage lines as well) and connected respectively to the quantum cells 9 via the switch portions SW15a to SW15n which are described later. The power sources 13-1 and 13-3 output a voltage having a predetermined voltage value and supply, to the quantum cells 9, a current corresponding to a peak current value required for the conditioning.

Figure 3A:
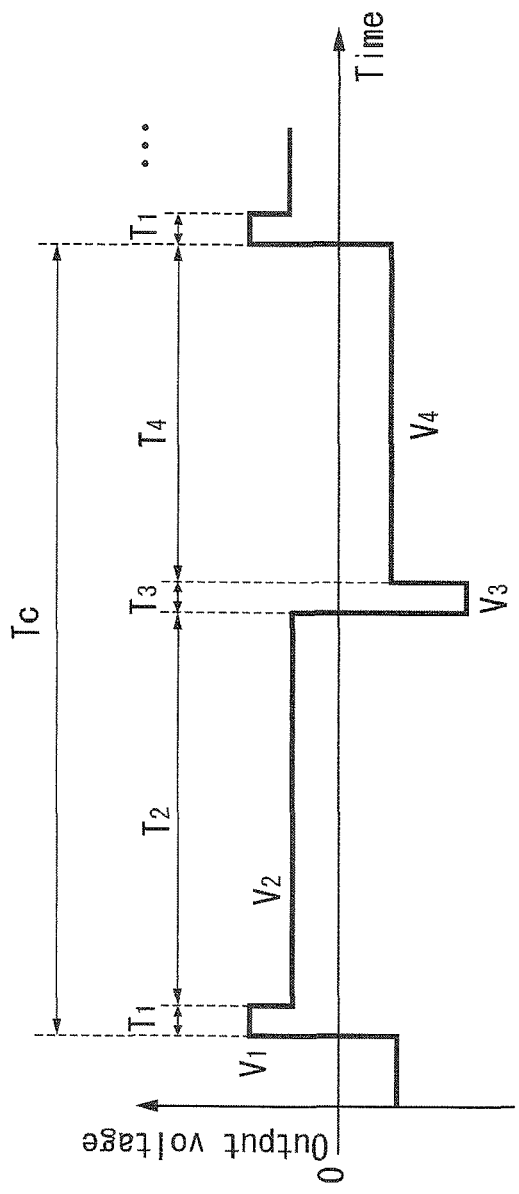
FIG. 3 is an explanatory view illustrating conventional conditioning operation of a secondary cell.
Figure 3B:
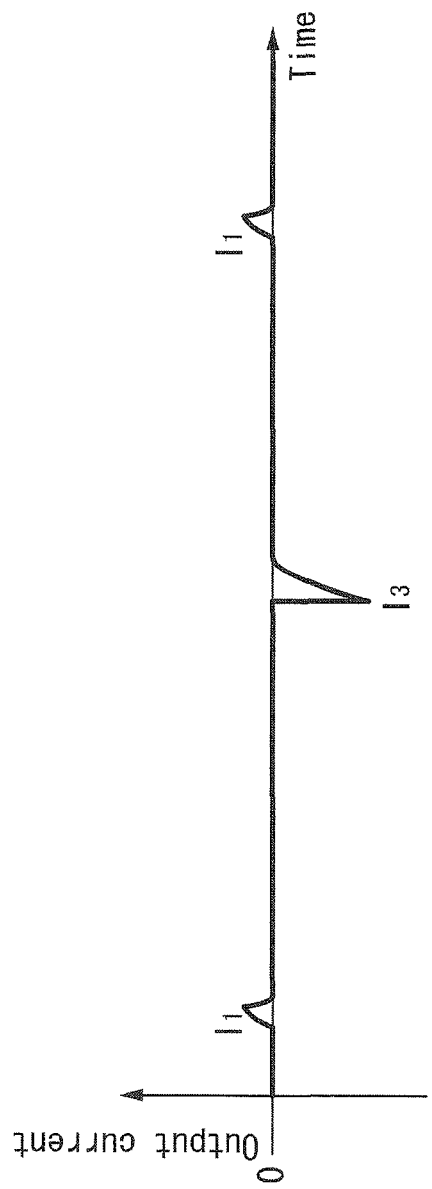
Figure 4:
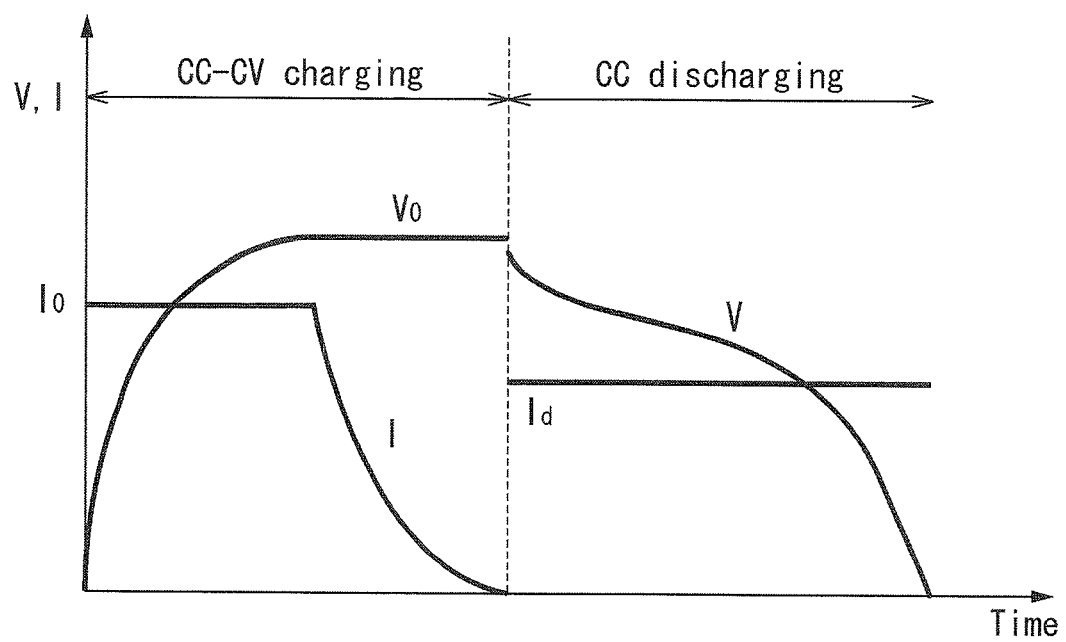
FIG. 4 is a view illustrating charge/discharge operation for performing a charge/discharge test of a secondary cell as conventionally adopting a CC-CV charging method and a CC discharging method.
Figure 5:
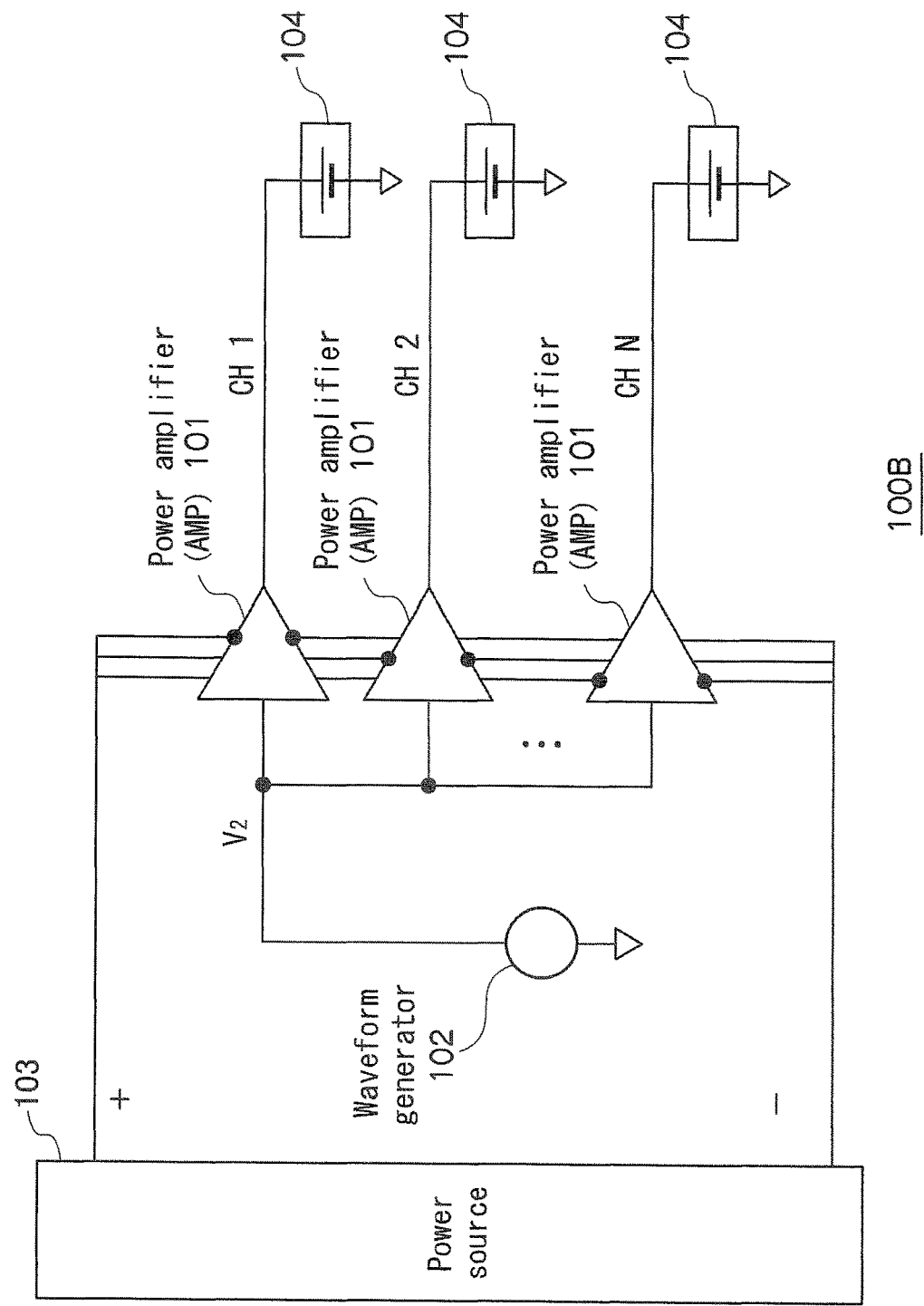
FIG. 5 is a structural view illustrating a first structure of a conventional charging/discharging device which performs charge/discharge operation on a plurality of secondary cells concurrently in parallel.
Figure 6:
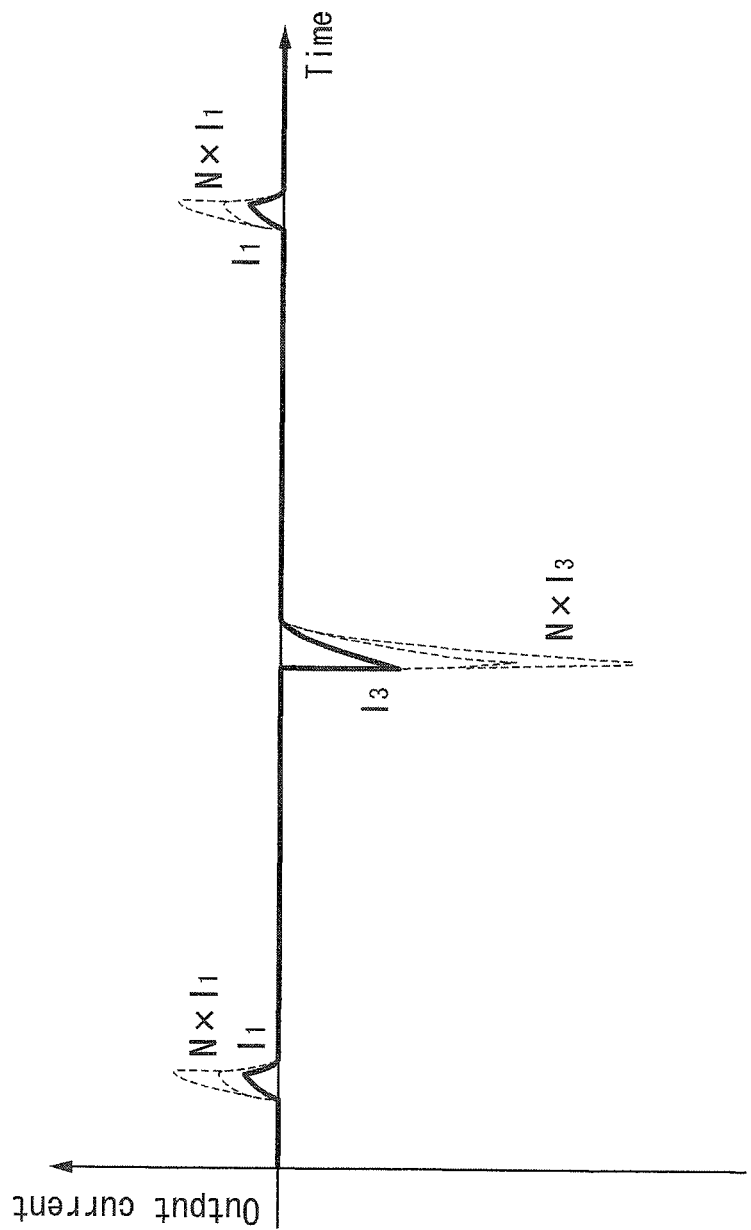
FIG. 6 illustrates a current waveform during performing conventional conditioning concurrently on a plurality of secondary cells.
Figure 7:
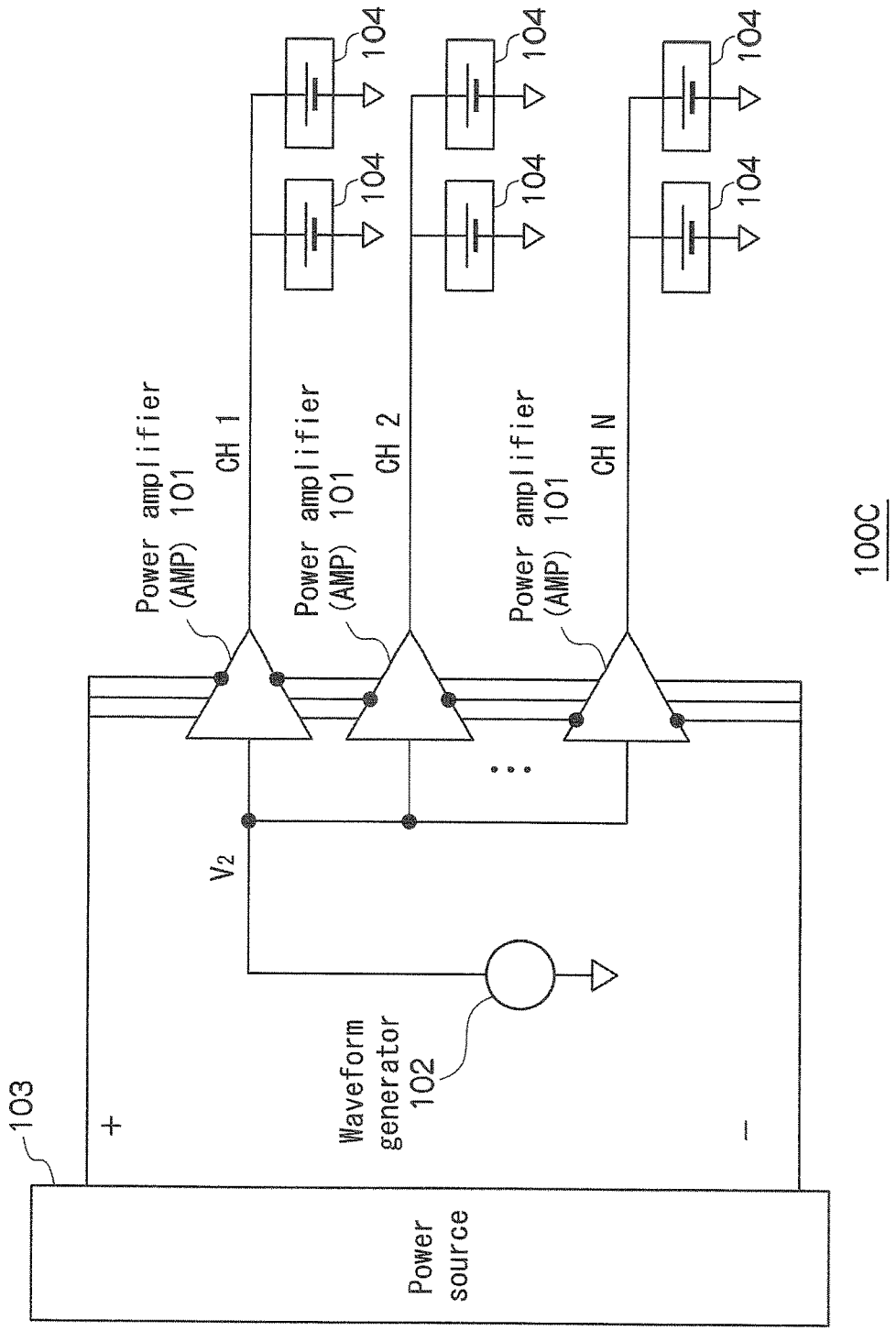
FIG. 7 is a structural view illustrating a second structure of a conventional charging/discharging device which performs charge/discharge operation on a plurality of secondary cells concurrently in parallel.

Charge operation and discharge operation exemplified in FIG. 3 are performed as the conditioning of the quantum cells 9. Here, it is effective that a high voltage is instantly applied in a forward direction just before charging the quantum cell 9 and a large current is instantly flown in a reverse direction just before discharging the quantum cell 9. The power source 13-1 outputs a voltage having a voltage value $V_1$, the power source 13-2 outputs a voltage having a voltage value $V_2$, the power source 13-3 outputs a voltage having a voltage value $V_3$, and the power source 13-4 outputs a voltage having a voltage value $V_4$ (see FIG. 3). That is, the power sources 13-1, 13-2 output the voltages for the charge operation on the quantum cells 9 and the power sources 13-3, 13-4 output the voltages for the discharge operation on the quantum cells 9.

In the following, electric power at the time just before supplying charge electric power being instantaneously higher than the charge electric power is denoted as instantaneously high charge electric power. Electric power at the time just before supplying discharge electric power being instantaneously higher than the discharge electric power is denoted as instantaneously high discharge electric power.

The power rail 14 is a bundle of a plurality of power lines to which the respective power sources 13-1 to 13-4 are connected. The power rail 14 includes a $V_1$-fource line to which the power source 13-1 is connected, a $V_2$-fource line to which the power source 13-2 is connected, a $V_3$-fource line to which the power source 13-3 is connected, a $V_4$-fource line to which the power source 13-4 is connected, a $V_1$-sense line, and a $V_3$-sense line.

Here, a sensing line described in claims is for detecting a voltage at a contact point with the quantum cell 9 being a cell. In this specification in the following, the sensing line is described as being denoted as a voltage sensing line or a sense line such as the $V_1$-sense line and the $V_3$-sense line.

The $V_1$-fource line and the $V_2$-fource line are power lines for charging to supply voltages from the power sources 13-1, 13-2 to the quantum cells 9 for causing the charge operation to be performed. The $V_3$-fource line and the $V_4$-fource line are power lines for discharging to supply voltages from the power sources 13-3, 13-4 to the quantum cells 9 for causing the discharge operation to be performed.

The $V_1$-sense line and the $V_3$-sense line are power lines for detecting voltages at contact points with the quantum cells 9. In a case that a relatively large voltage having a value such as the voltage values $V_1$, $V_3$ is applied, the voltage sensing lines (the $V_1$-sense line and the $V_3$-sense line) are connected to the quantum cells 9 in addition to the voltage lines (the $V_1$-fource line and the $V_3$-fource line). According to the above, owing to that voltages output from the power sources 13-1, 13-2 is kept constant by causing voltage values applied to the quantum cells 9 to be fed back to the power sources 13-1, 13-2, it is possible to provide compensation for the amount of voltage drop occurring with a current flowing through the switch portions SW15a to SW15n, the $V_1$-fource line, and the $V_3$-fource line. Thus, voltages having the voltage values $V_1$, $V_3$ can be applied accurately to the quantum cells 9.

Here, a current flows through the switch portions SW15a to SW15n and the like even in a case that a relatively small voltage having a value such as the voltage values $V_2$, $V_4$ is applied. However, since the flowing current is not large, the amount of voltage drop thereof can be considered as being within an error range. For example, it is in the order of 1 mV even with a current of 10 mA flowing through 0.1Ω. Accordingly, in the present embodiment, voltage sensing lines are not arranged for detecting voltages at contact points with the quantum cells 9 when voltages having the voltage values $V_2$, $V_4$ are output. However, in a case that voltage values applied from the power sources 13-1 to 13-4 through voltage lines are required to be fed back, it is also possible to arrange a voltage sensing line to each voltage line as needed.

The switch portions SW15a to SW15n are arranged between all the voltage lines structuring the power rail 14 and the quantum cells 9 on which conditioning is performed, so that connection switching between the respective voltage lines and the quantum cells 9 is performed with control of the switch flip controller 12.

The switch portions SW15a to SW15n include switches which perform connection switching between the respective voltage lines and the quantum cells 9. For example, the switch portion SW15a includes a switch Sa1f which is connected to the $V_1$-force line, a switch Sa1s which is connected to the $V_1$-sense line, a switch Sa2f which is connected to the $V_2$-force line, a switch Sa3f which is connected to the $V_3$-force line, a switch Sa3s which is connected to the $V_3$-sense line, and a switch Sa4f which is connected to the $V_4$-force line.

The control terminal 11 controls a conditioning operation of the conditioning device 1. The control terminal 11 performs setting of operational conditions of the conditioning of the quantum cells 9, instructing of switch flip for the later-mentioned switch flip controller 12, displaying of conditioning results, and the like.

For example, a personal computer which is connected to the power sources 13-1 to 13-4 and the switch flip controller 12 via a network (e.g., LAN (registered trademark) or the like) may be adopted as the control terminal 11. Alternatively, in a case that respective structural elements illustrated in FIG. 1 are formed into a device of a single unit, the control terminal 11 may be a control unit as a component (structural element) of the conditioning device 1.

Further, control functions of the control terminal 11 in the conditioning operation can be actualized with so-called software processing. The control terminal 11 has a hardware structure being the same as a structure of an existing computer. For example, the control terminal 11 includes a CPU, a ROM, a RAM, an EEPROM, an input/output interface, and the like. Owing to that processing programs stored in the ROM is executed by the CPU, the control functions of the control terminal 11 can be actualized.

Figure 9:
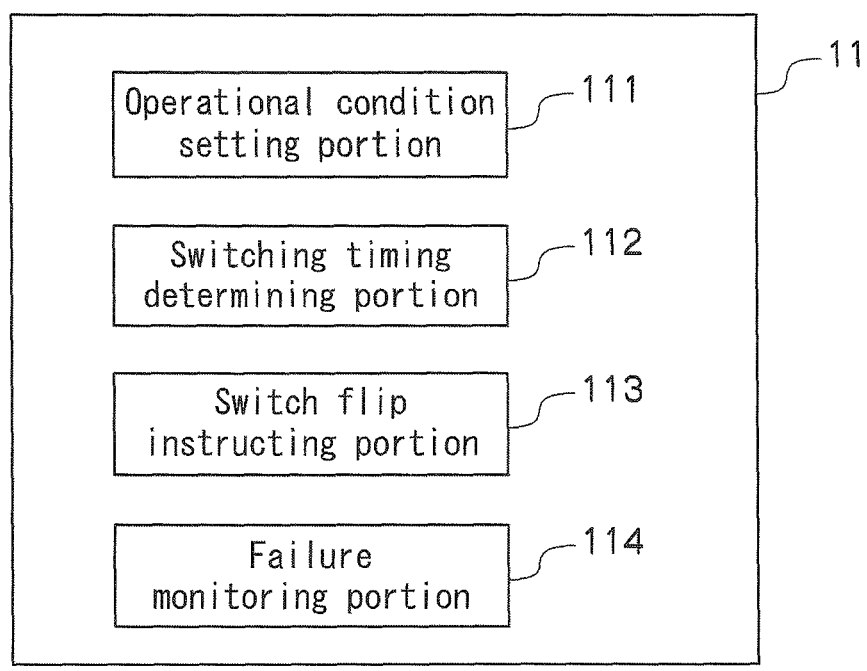
FIG. 9 is a functional block diagram illustrating control functions of conditioning operation actualized by a control terminal of the first embodiment.

FIG. 9 is a functional block diagram illustrating control functions of conditioning operation actualized by the control terminal 11. In FIG. 9, the control terminal 11 mainly includes an operational condition setting portion 111, a switching timing determining portion 112, a switch flip instructing portion 113, and a failure monitoring portion 114.

The operational condition setting portion 111 sets operational conditions for the conditioning operation based on a user operation. Here, the setting of the operational conditions may be performed based on information input through the user operation. Alternatively, the setting may be performed by selecting from a plurality of previously-set operational conditions.

Examples of the operational conditions for the conditioning operation include a pattern of a voltage waveform output by the power sources 13 (13-1 to 13-4). According to the voltage waveform pattern, the respective output voltage values and output time of the output voltage values are set for charging and discharging the quantum cells 9.

Here, in the conditioning of the quantum cells 9, each voltage is applied to the quantum cells 9 for time $T_1$, $T_2$, $T_3$, $T_4$ as having the voltage value $V_1$, $V_2$, $V_3$, $V_4$ as illustrated in FIG. 3. In the conditioning, a cyclic operation from $T_1$ to $T_4$ is repeatedly performed continuously for a predetermined time with a process from $T_1$ to $T_4$ being as one cycle.

Further, the operational conditions may include the number of conditionings (i.e., the number of quantum cells 9 on which the conditioning is performed), conditioning time, and the like.

The switching timing determining portion 112 determines switching timing of the switches which are flipped by the switch flip controller 12 based on the operational conditions set by the operational condition setting portion 111. For example, the switching timing determining portion 112 divides time of one cycle of the conditioning operation into a predetermined number of times and ON/OFF of the respective switch portions SW15a to SW15n is determined for each divided time.

The switch flip instructing portion 113 provides an instruction of switch flipping to the switch flip controller 12 based on the switching timing determined by the switching timing determining portion 112.

The failure monitoring portion 114 monitors presence or absence of a failure such as a malfunction of the quantum cell 9 on which conditioning is performed. In a case that a failure occurs, the failure monitoring portion 114 causes all the switch portions SW15 which are connected to the failed quantum cell 9 to be flipped off.

As described above, the power sources 13-1, 13-3 can monitor voltages through the voltage sensing lines ($V_1$-sense line, $V_3$-sense line) while voltages $V_1$, $V_3$ are applied. Since the voltage at the voltage sensing line is varied when a failure occurs at the quantum cell 9, the power sources 13-1, 13-3 detect the failure of the quantum cell 9 by monitoring the voltages of the voltage sensing lines.

The failure monitoring portion 114 specifies the failed quantum cell 9 based on the monitoring result from the power source 13-1 or 13-3.

Here, the failed quantum cell 9 can be specified with a method which is based on the switching timing of the switch portions SW15a to SW15n and failure occurrence time. For example, when notification of failure occurrence is received from the power source 13-1 or 13-3, the failure monitoring portion 114 checks failure occurrence time. Then, the failed quantum cell 9 can be specified owing to that the quantum cell 9 which is connected to the $V_1$-force line or the $V_3$-force line at the failure occurrence time is determined in reference to the switching timing of the switch portions SW15a to SW15n.

Further, the failure monitoring portion 114 instructs the switch flip controller 12 to cause all the switches of the switch portion SW15 at the failed quantum cell 9 to be flipped off. Thus, the failed quantum cell 9 can be disconnected from the power rail 14.

The switch flip controller 12 performs switch flip control on the switch portions SW15a to SW15n in accordance with an instruction from the control terminal 21.

(B-2) Operation of First Embodiment

Next, operation of the conditioning process on the quantum cells 9 by the conditioning device 1 of the first embodiment will be described in detail with reference to the drawings.

FIG. 10 is a flowchart illustrating the operation of the conditioning process on the quantum cells 9 to be performed by the conditioning device 1 of the first embodiment.

First, the quantum cells 9 on which conditioning is to be performed are connected to connection terminals of the corresponding switch portions SW15 in the conditioning device 1.

For performing conditioning on the quantum cells 9, operational conditions are input to the control terminal 11 owing to a user operation. The operation condition setting portion 111 sets the operational conditions (S101) and operation time of one cycle is divided (S102).

For example, as the operational conditions of the conditioning, the voltages $V_1$ to $V_4$ to be output from the power sources 13-1 to 13-4 are set to +5V, +2.5V, −5V, and −3V, respectively.

Here, the number of cells on which the conditioning is performed is set to ten, for example. In this case, the operation time of one cycle is divided into ten. When the operation time of one cycle is 20 seconds, one divided slot becomes to two seconds. Here, applying time $T_1$ of $V_1$ is two seconds, applying time $T_2$ of $V_2$ is eight seconds, applying time $T_3$ of $V_3$ is two seconds, and applying time $T_4$ of $V_4$ is eight seconds.

Next, in the control terminal 11, the switching timing determining portion 112 determines, based on the set operational conditions, switching timing of the switch portions SW15a to SW15j for ten quantum cells 9a to 9j on which the conditioning is performed (S103).

In the above, the switching timing determining portion 112 exemplifies a case that one cycle time of the conditioning operation is divided into the total number of the quantum cells 9. However, not limited to the above, it is also possible that two quantum cells 9 are grouped and the quantum cells 9 in each group are charged and discharged concurrently. In this case, the switching timing determining portion 112 may determine switching timing while the operation time of one cycle is divided into five. Further in this case, the power sources 13-1 to 13-4 are required to have a current supply capacity corresponding to the number of quantum cells 9 in one group.

Figure 11A:
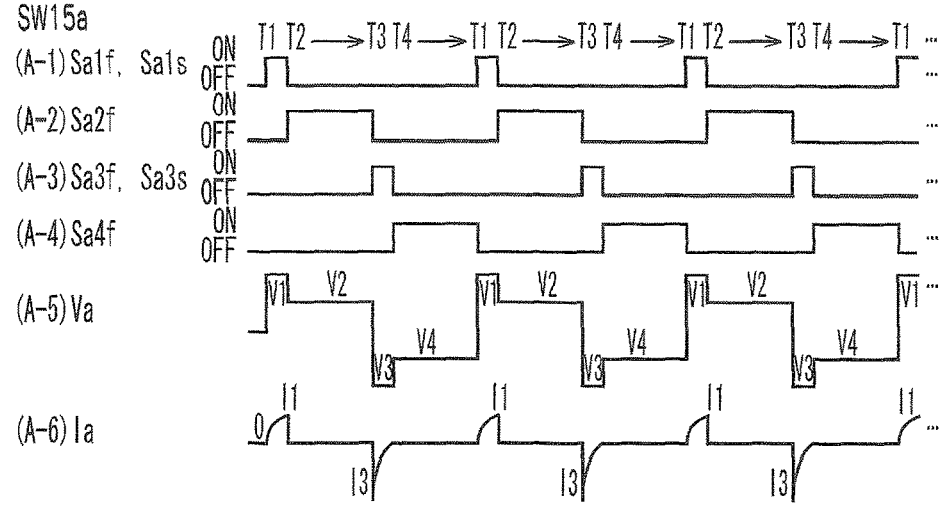
FIG. 11 is a view illustrating switching timing of switch portions of the first embodiment.
Figure 11B:
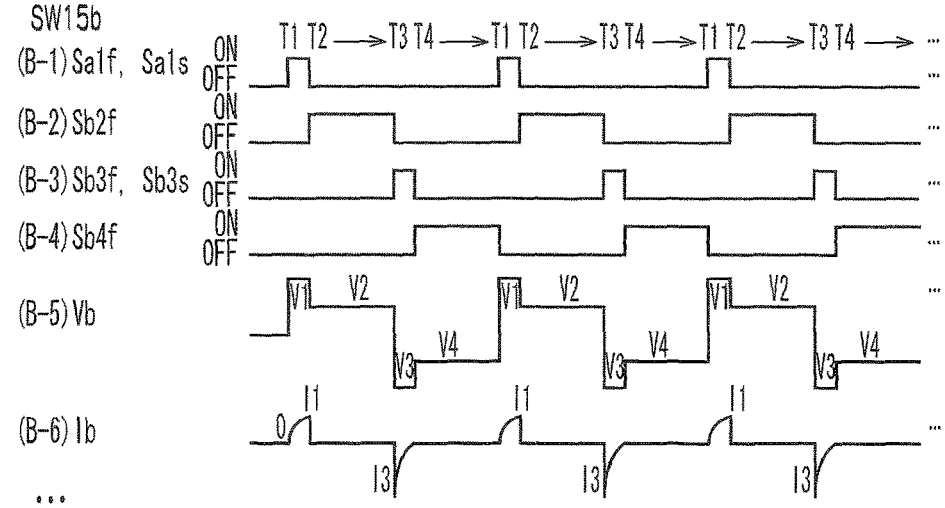
Figure 11C:
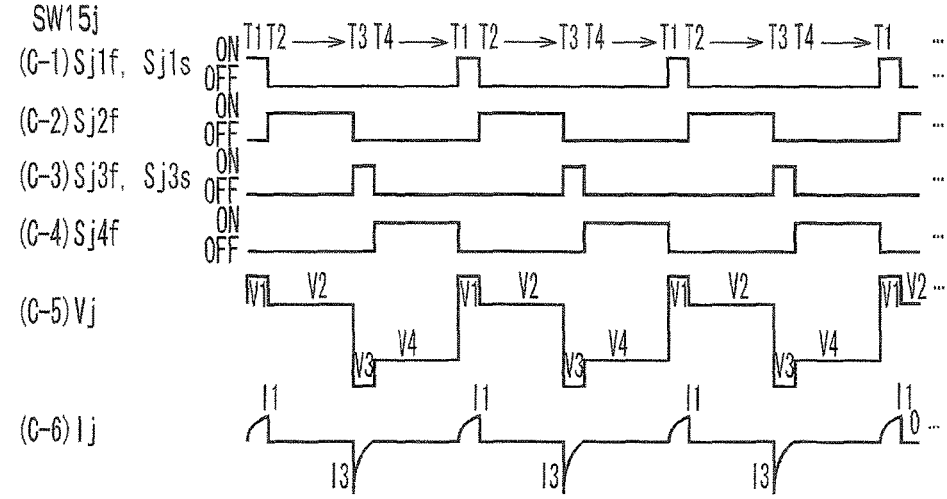

FIG. 11 is a view illustrating switching timing of the respective switch portions SW15a to SW15j. FIG. 11 illustrates switching timing in a case that the operation time of one cycle is divided into ten.

As illustrated in FIG. 11, the switching timing determining portion 112 determines switching timing for each of the switch portions SW15a to SW15j. Here, the operation time of one cycle is divided into ten and the switching timing determining portion 112 determines which switch is flipped on for each divided slot.

Regarding the switch portion SW15a, for example, in the first divided slot corresponding to time $T_1$, the switching timing determining portion 112 causes the switches Sa1f, Sa1s to be flipped on and all the remaining switches to be flipped off so that the voltage having the voltage value $V_1$ is applied to the quantum cell 9a (see FIG. 1).

Subsequently, in the second to fifth divided slots corresponding to time $T_2$, the switching timing determining portion 112 causes the switch Sa2f to be flipped on and all the remaining switches to be flipped off so that the voltage having the voltage value $V_2$ is applied to the quantum cell 9a (see FIG. 1).

Subsequently, in the sixth divided slot corresponding to time $T_3$, the switches Sa3f, Sa3s are flipped on and all the remaining switches are flipped off so that the voltage having the voltage value $V_3$ is applied to the quantum cell 9a (see FIG. 1).

Subsequently, in the seventh to tenth divided slots corresponding to time $T_4$, the switching timing determining portion 112 causes the switch Sa4f to be flipped on and all the remaining switches to be flipped off so that the voltage having the voltage value $V_4$ is applied to the quantum cell 9a (see FIG. 1).

Similarly to the above, the switching timing determining portion 112 determines one cycle switching timing of the switch portions SW15b to SW15j as well. Here, the switching timing determining portion 112 causes switching timing to be shifted by one divided slot for each so that connection is temporally shifted for the respective switch portions SW15a to SW15j.

Subsequently, the switch flip instructing portion 113 provides, to the switch flip controller 12, a switch flip instruction based on the switching timing of the respective switch portions SW15a to SW15j determined by the switching timing determining portion 112. Then, owing to that the switch flip controller 12 performs switch flipping for the switch portions SW15a to SW15j, the conditioning operation of the quantum cells 9a to 9j is started (S104).

Until the end time of the conditioning operation of the quantum cells 9a to 9j (S105), the switch flip instruction portion 113 of the control terminal 11 provides a switch flip instruction of the respective switch portions SW15a to SW15j to the switch flip controller 12. Then, the switch flip controller 12 performs switch flipping.

First, the switch flip controller 12 causes the switches Sa1f, Sa1s of the switch portion SW15a to be flipped on for the time $T_1$ for applying the voltage having the voltage value $V_1$ to the quantum cell 9a. At that time, the switch flip controller 12 causes all the switches of other than the switches Sa1f, Sa1s of the switch portion SW15a to be flipped off.

Subsequently, when the time $T_1$ elapses after the switches Sa1f, Sa1s are flipped on, the switch flip controller 12 causes the switches Sa1f, Sa1s of the switch portion SW15a to be flipped off. Concurrently, the switch flip controller 12 causes the switch Sa2f of the switch portion SW15a to be flipped on for the time $T_2$ for applying the voltage having the voltage value $V_2$ to the quantum cell 9a and the switch flip controller 12 causes the switches Sb1f, Sb1s of the switch portion SW15b to be flipped on for the time $T_1$ for applying the voltage having the voltage value $V_1$ to the quantum cell 9b.

Subsequently, when the time $T_1$ elapses after the switches Sb1f, Sb1s are flipped on, the switch flip controller 12 causes the switches Sb1f, Sb1s of the switch portion SW15b to be flipped off. Concurrently, the switch flip controller 12 causes the switch Sb2f of the switch portion SW15b to be flipped on for the time $T_2$ for applying the voltage having the voltage value $V_2$ to the quantum cell 9b and the switch flip controller 12 causes the switches Sc1f, Sc1s of the switch portion SW15c (not illustrated in FIG. 11) to be flipped on for the time $T_1$ for applying the voltage having the voltage value $V_1$ to the subsequent quantum cell 9c.

Further, regarding the switch portion SW15a, when the time $T_2$ elapses after the switch Sa2f is flipped on, the switch flip controller 12 causes the switch Sa2f of the switch portion SW15a to be flipped off. Concurrently, the switch flip controller 12 causes the switch Sa3f, Sa3s of the switch portion SW15a to be flipped on for applying the voltage having the voltage value $V_3$ to the quantum cell 9a.

Subsequently, when the time $T_3$ elapses after the switches Sa3f, Sa3s of the switch portion SW15a are flipped on, the switch flip controller 12 causes the switches Sa3f, Sa3s of the switch portion SW15a to be flipped off. Concurrently, the switch flip controller 12 causes the switch Sa4f of the switch portion SW15a to be flipped on for applying the voltage having the voltage value $V_4$ to the quantum cell 9a and the switch flip controller 12 causes the switches Sb3f, Sb3s of the switch portion SW15b to be flipped on for the time $T_3$ for applying the voltage having the voltage value $V_3$ to the quantum cell 9b.

Subsequently, when the time $T_4$ elapses after the switch Sa4f of the switch portion 15a is flipped on, the switch flip controller 12 causes the switches Sa1f, Sa1s of the switch portion SW15a to be flipped on for time $T_1$ for applying the voltage having the voltage value $V_1$ to the quantum cell 9a.

Thus, after one cycle of switching timing control of the respective switch portions SW15a to SW15j is completed, the switch flip controller 12 performs one subsequent cycle of switching timing control in a cyclic manner until the end time of the conditioning operation.

FIG. 11 illustrates voltages applied to the quantum cells 9a to 9j and currents caused to flow due to the voltage applying. A voltage applied to an xth quantum cell 9 is denoted as Vx and a current flowing therethrough is denoted as Ix.

In FIG. 11, at the timing of $T_1$, the voltage $V_1$ is applied to the quantum cell 9 and a current $I_1$ ($I_{1peak}=V_{gb0}/R_{gb}$) flows therethrough. At the timing of $T_3$, the voltage $V_3$ is applied to the quantum cell 9 and a current $I_3$ ($I_{3peak}=(V_{gb0}-V_3)/R_{gb}$) flows therethrough.

To facilitate understanding of the operation, Ix is 0 A at the timing of $T_2$ and $T_4$ in FIG. 11. In reality, a small current is continuously flown by the amount of charging which is not completed in the period of $T_1$ or the amount of discharging which is not completed in the period of $T_3$. However, the current is sufficiently small compared to $I_1$ and $I_3$. Further, since voltage being applied to the quantum cell 9 is temporally divided, the current is leveled into a certain constant value. Here, $I_2$ and $I_4$ are taken as 0 A accordingly.

Figure 12:
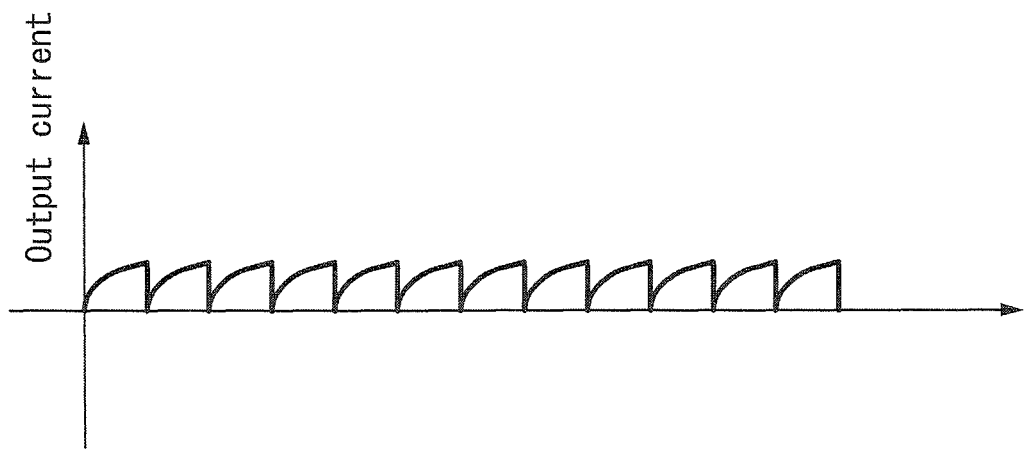
FIG. 12 is a view illustrating a waveform of current flowing on a $V_1$-force line when performing conditioning on quantum cells in the first embodiment.
Figure 13:
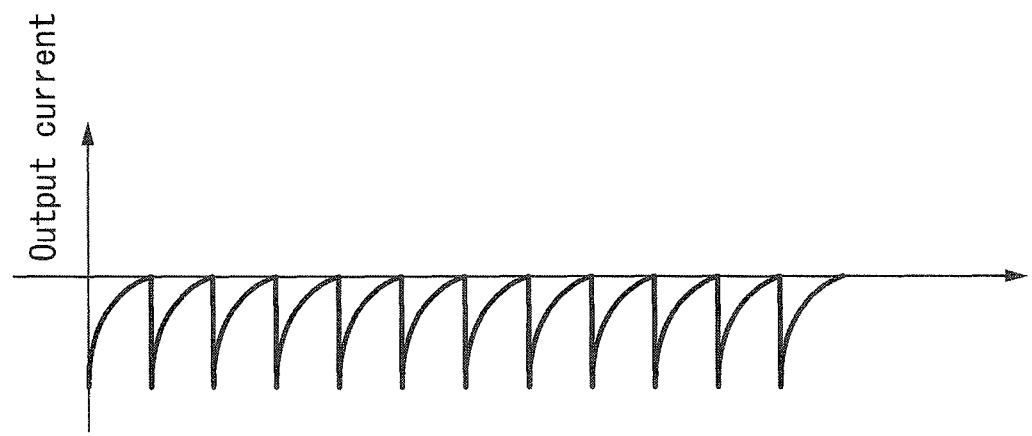
FIG. 13 is a view illustrating a waveform of current flowing on a $V_3$-force line when performing conditioning on quantum cells in the first embodiment.

FIG. 12 is a view illustrating a waveform of a current flowing on the $V_1$-force line. FIG. 13 is a view illustrating a waveform of current flowing on the $V_3$-force line.

As illustrated in FIGS. 12 and 13, peak positions of the currents flowing on the $V_1$-force line and the $V_3$-force line can be shifted by applying voltages to the plurality of quantum cells 9 in a temporally divided manner. Accordingly, even though the conditioning is performed on the plurality of quantum cells 9 concurrently in parallel, the current peak can be suppressed to the same level in a case with a single quantum cell 9. Consequently, the power source ($V_1$) 13-1 and the power source ($V_3$) 13-3 are simply required to have a current supply capacity of $I_1$ and $I_3$.

While the conditioning is performed on the quantum cells 9, the failure monitoring portion 114 of the control terminal 11 monitors whether or not a failure occurs based on the monitoring result from the power source 13-1 or 13-3.

When a failure occurs, the failure monitoring portion 114 specifies the failed quantum cell 9 by determining the quantum cell 9 which is connected to the $V_1$-fource line or the $V_3$-fouce line at the failure occurrence time in reference to the switching timing of the switch portions SW15a to SW15n.

The failure monitoring portion 114 causes the switch flip controller 12 to flip off all the switches of the switch portion SW15 for the failed quantum cell 9 to disconnect the failed quantum cell 9 from the power rail 14.

(B-3) Description of Failure Detection Process of Quantum Cell 9

Figure 21:
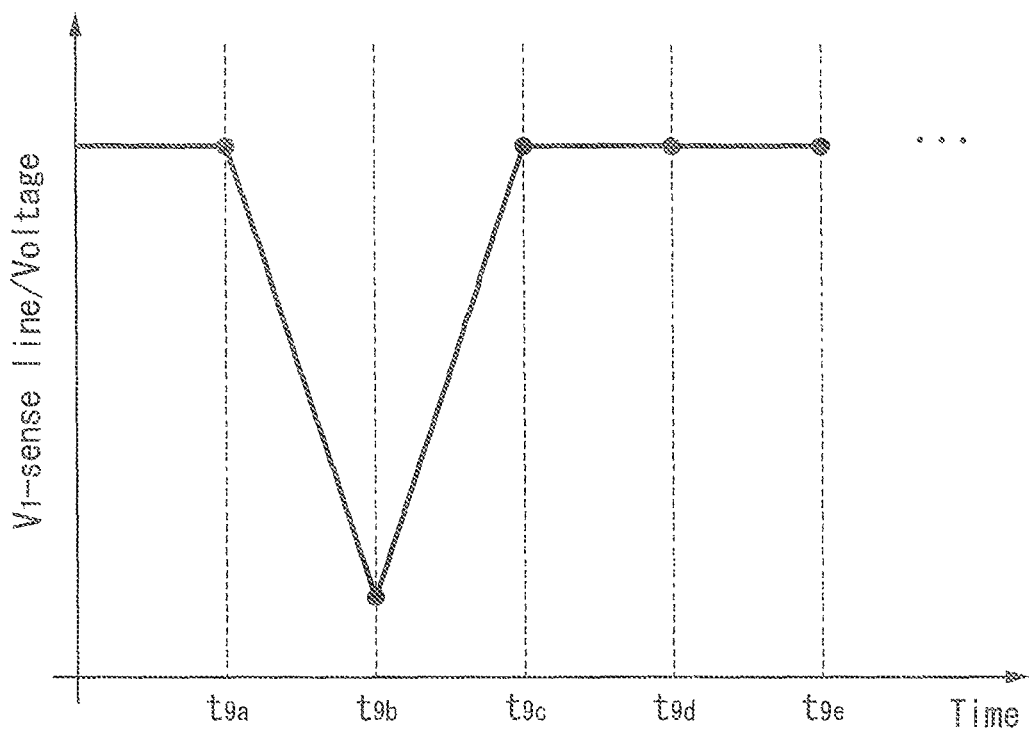
FIG. 21 is an explanatory view illustrating a failure detection process of a quantum cell according to the first embodiment.

FIG. 21 is an explanatory view illustrating a failure detection process of the quantum cell 9 according to the first embodiment. For example, FIG. 21 illustrates a monitoring result of voltage values of the voltage detected through the $V_1$-sense line by the power source ($V_1$) 13-1.

Examples of failures occurring at the quantum cell 9 include an external or internal short circuit of the quantum cell 9. Here, voltage values are monitored as an example. It is also possible to monitor voltage values at the $V_1$-force line or the quantum cell 9 and to determine whether or not a failure occurs at the quantum cell 9 based on the voltage values.

As a method to detect failure occurrence, a variety of methods can be widely adopted. For example, it is possible to adopt a method to set threshold values being an upper limit value and a lower limit value for failure detection and to determine that the quantum cell 9 is normal when the detected voltage value is in a range between the upper limit value and the lower limit value. In this case, it is possible to determine that the quantum cell 9 fails when the detected voltage value exceeds the upper limit value or the detected voltage value falls below the lower limit value. Alternatively, for example, it is possible to adopt a method to set threshold values being an upper limit value and a lower limit value and to determine that the quantum cell 9 fails when the detected voltage value is in a range between the upper limit value and the lower limit value. In this case, it is possible to determine that the quantum cell 9 is normal when the detected voltage value exceeds the upper limit value, to determine that the quantum cell 9 fails when the detected voltage value is between the upper limit value and the lower limit value inclusive, and to determine that the quantum cell 9 is normal when the detected voltage value falls below the lower limit value.

FIG. 21 illustrates a case that a failure occurs at the quantum cell 9b. The example of FIG. 21 adopts the method to determine that the quantum cell 9 is normal when the detected voltage value is in the range between the threshold values being the upper limit value and the lower limit value. In the case that a failure occurs at the quantum cell 9b, the output voltage is not supplied properly from the power source ($V_1$) 13-1 and the detected voltage value at the $V_1$-sense line becomes smaller than the output voltage value of the power source ($V_1$) 13-1. In the example of FIG. 21, for example, the failure monitoring portion 114 compares the voltage value detected at the $V_1$-sense line to the threshold value being the lower limit value, and determines whether or not the voltage value detected at the $V_1$-sense line is below the threshold value being the lower limit value. Thus, the failure monitoring portion 114 detects failure occurrence at the quantum cell 9b in a case that the detected voltage value at the $V_1$-sense line is below the threshold value being the lower limit value. The failure monitoring portion 114 recognizes switching timing of the respective switch portions SW15a to SW15n determined by the switching timing determining portion 112 and recognizes which quantum cell 9 is connected to the $V_1$-force line. When failure occurrence is detected based on the detected voltage value at the $V_1$-sense line, the failure monitoring portion 114 preserves the detection time (failure occurrence detection time $t_{9b}$ in the example of FIG. 21) and specifies the switch portion SW15b to which the $V_1$-force line is connected at the detection time $t_{9b}$. Thus, the failure monitoring portion 114 can specify the failed quantum cell 9 (quantum cell 9b in this case). As described above, since the failure monitoring portion 114 handles the respective switching timing of the switch portions SW15 connected to the power rail 14, the failure monitoring portion 114 can specify the quantum cell 9 connected to the power line at the detection time as long as being capable of recognizing the time at which an abnormal voltage value (or current value) is detected.

Figure 22:
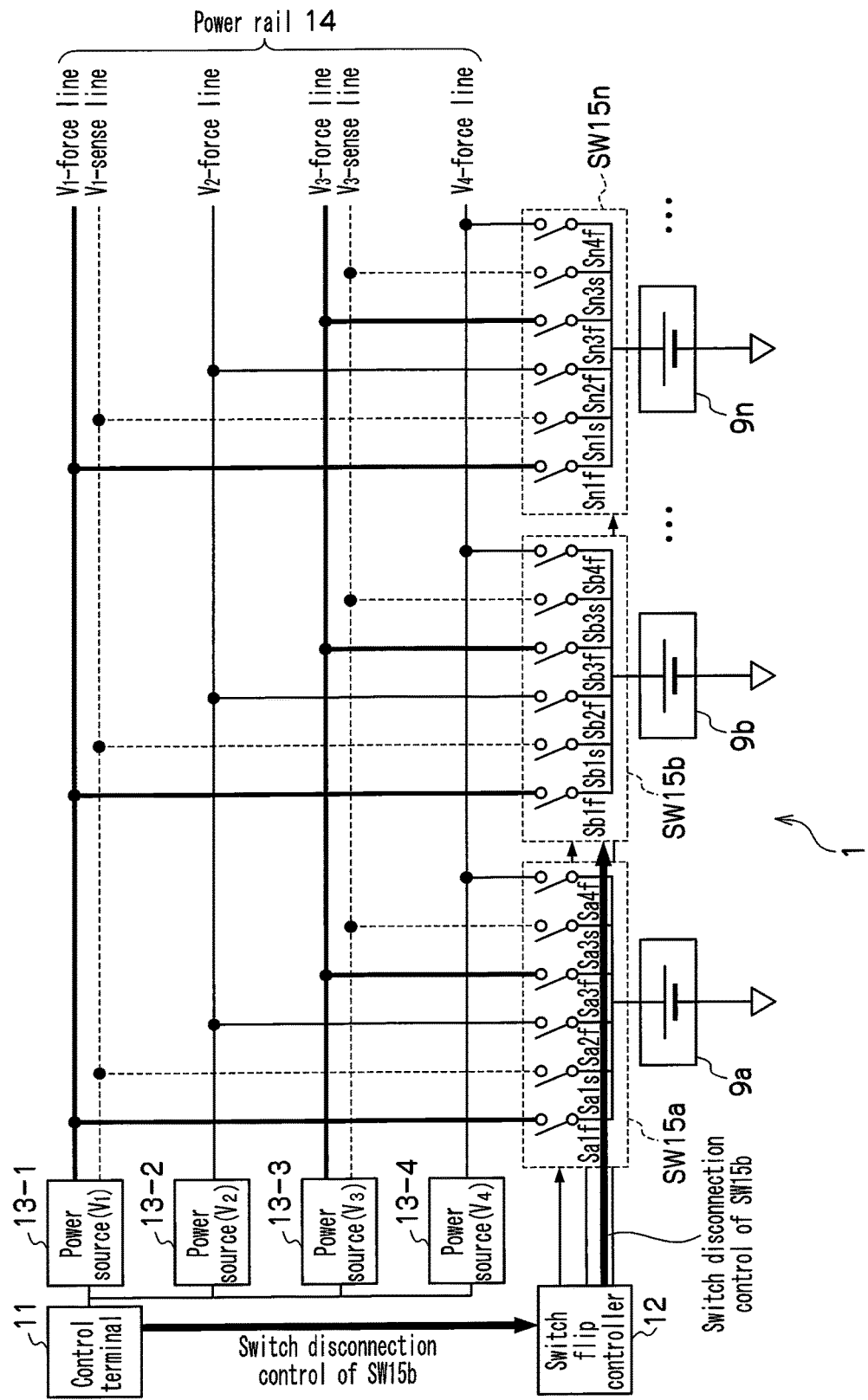
FIG. 22 is an explanatory view illustrating switch flip operation when failure occurrence is detected by a failure monitoring portion of the first embodiment.

When the failure monitoring portion 114 specifies the failed quantum cell 9b, the failure monitoring portion 114 provides an instruction to the switch flip controller 12 to flip off all the switches of the switch portion SW15b, as illustrated in FIG. 22. Then, the switch flip controller 12 flips off all the switches of the instructed switch portion SW15b.

Thus, only the failed quantum cell 9b can be disconnected. Here, even if only the failed quantum cell 9b is disconnected from the power rail 14, the conditioning can be continued without change on other normal quantum cells 9 connected to the power rail 14. That is, since only the failed quantum cell 9b can be disconnected without stopping operation of the entire conditioning device 1, efficiency of the conditioning operation can be improved.

Here, when the failed quantum cell 9 is detected, the control terminal 11 may provide, for example, notification with a sound (e.g., a warning sound such as a buzz, an audio sound, or the like) for notifying fault detection, notification with blinking or lighting of an alarm lamp, message displaying (e.g., pop-up displaying or the like) to notify fault detection on a display of the control terminal 11, or the like.

Further, in the example of FIGS. 21 and 22, the failed quantum cell 9 is specified and disconnected from the power rail 14 based on variation of the detected voltage value at the $V_1$-sense line. Here, the similar process can be performed based on variation of the detected voltage value at the $V_3$-sense line. Further, in a case that voltage sensing lines are arranged respectively for the $V_2$-force line and the $V_4$-force line, the similar process can be performed based on variation of detected voltage values at each of the $V_2$-force line and the $V_4$-force line (B-4) Modified Embodiment of First Embodiment FIG. 23 is a functional block diagram illustrating control functions of a modified embodiment of the control terminal 11 of the first embodiment.

Figure 23:
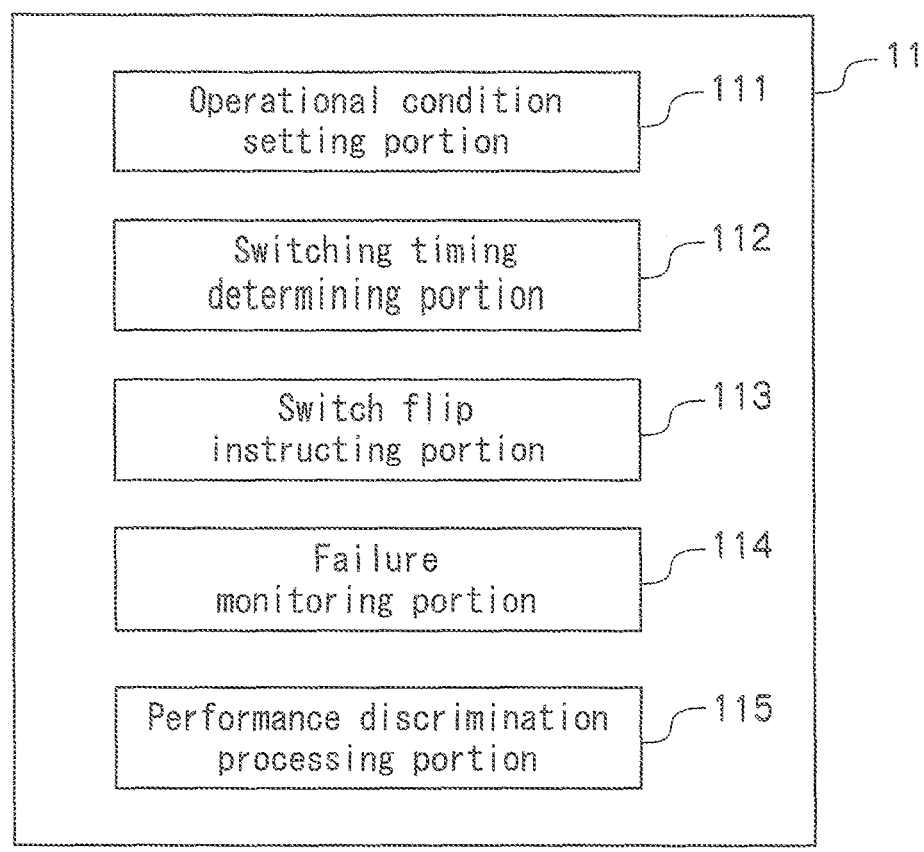
FIG. 23 is a functional block diagram illustrating control functions of a control terminal of a modified embodiment of the first embodiment.

As illustrated in FIG. 23, the control terminal 11 of the modified embodiment of the first embodiment includes a performance discrimination processing portion 115 in addition to the operational condition setting portion 111, the switching timing determining portion 112, the switch flip instruction portion 113, and the failure monitoring portion 114 which are described above.

The control terminal 11 of the modified embodiment confirms charge characteristics and discharge characteristics of the respective conditioning-completed quantum cells 9 after the conditioning is completed and determines whether or not charge operation and discharge operation of the respective quantum cells 9 are activated. Measurement data of the charge characteristics and the discharge characteristics of the respective quantum cells 9 after the conditioning are stored in the control terminal 11.

Examples of the method of measuring the charge characteristics of the quantum cell 9 include a method with controlling the switch flip controller 12 to connect the conditioning-completed quantum cell 9 to the $V_2$-force line in FIG. 1, to flow a current through the quantum cell 9 as applying the charging voltage ($V_2$) to the quantum cell 9, and to detect temporal change of a capacity of the quantum cell 9 until the quantum cell 9 is fully charged (charged to a predetermined upper limit capacity); and a method to obtain a charging rate of a capacity of the quantum cell 9 against the predetermined upper limit capacity when a predetermined voltage is applied to the quantum cell 9 for a predetermined time. Further, examples of the method of measuring the discharge characteristics of the quantum cell 9 include a method to obtain a discharging rate of a remaining capacity of the quantum cell 9 against the fully-charged capacity when discharging is performed for a predetermined time with the charged quantum cell 9. These measurement data are stored in the control terminal 11 for each quantum cell 9 (or for each switch portion SW15 to which the quantum cell 9 is connected). For example, in a method of storing the measurement data, the measurement data may be stored in correspondence with identification information (e.g., an identification number such as an ID) of the switch portion SW15 to which the quantum cell 9 is connected.

The performance discrimination processing portion 115 performs discrimination in accordance with performance of the quantum cells 9 using the measurement data (charge characteristics, discharge characteristics) of all the conditioning-completed quantum cells 9. The performance discrimination processing portion 115 may use either or both of measurement data being the charge characteristics and the discharge characteristics. Further, for example, it is also possible to perform discrimination on the conditioning-completed quantum cells 9 into a plurality of groups by comparing the measurement data being the charge characteristics (or the discharge characteristics) to one or a plurality of threshold values. Owing to such grouping, the quantum cells 9 may be discriminated in accordance with performance of the charge/discharge characteristics.

(B-5) Effects of First Embodiment

As described above, according to the first embodiment, a plurality of secondary cells (quantum cells) can be caused to perform charge/discharge operation at temporally different timing through the power rail. Therefore, the plurality of secondary cells can be caused to perform the charge/discharge operation concurrently in parallel even though a power source having a high current supply capacity is not arranged.

As a result, since the plurality of secondary cells can be caused to perform charge/discharge operation concurrently in parallel without requiring an expensive power source, a circuit required for one quantum cell can be inexpensively prepared.

Further, according to the first embodiment, owing to that electric power is supplied to a plurality of secondary cells concurrently in parallel in a temporally-divided manner, the current supply capacity from the power source can be appropriately leveled.

Further, according to the first embodiment, since temporally-divided power supply from the power rail can be controlled in timing due to ON/OFF of the switch portions performed by the control terminal such as a PC, the number of quantum cells to be operated concurrently in parallel can be increased or decreased easily.

Further, according to the first embodiment, concurrent power supply to a number of secondary cells in parallel is performed individually from the power rail via the switch portions. Therefore, even when a failure such as a malfunction occurs at a certain secondary cell, operation can be continued without causing a problem at other quantum cells simply by disconnecting the failed quantum cell by causing the switch portion to be OFF with control of the control terminal such as a PC.

(C) Second Embodiment

Next, a charging/discharging device according to a second embodiment will be described in detail with reference to the drawings.

The second embodiment exemplifies a case that the charging/discharging device of the present invention is applied to a charge/discharge testing device which performs a charge/discharge test on a plurality of quantum cells concurrently in parallel.

(C-1) Structure of Second Embodiment

Figure 14:
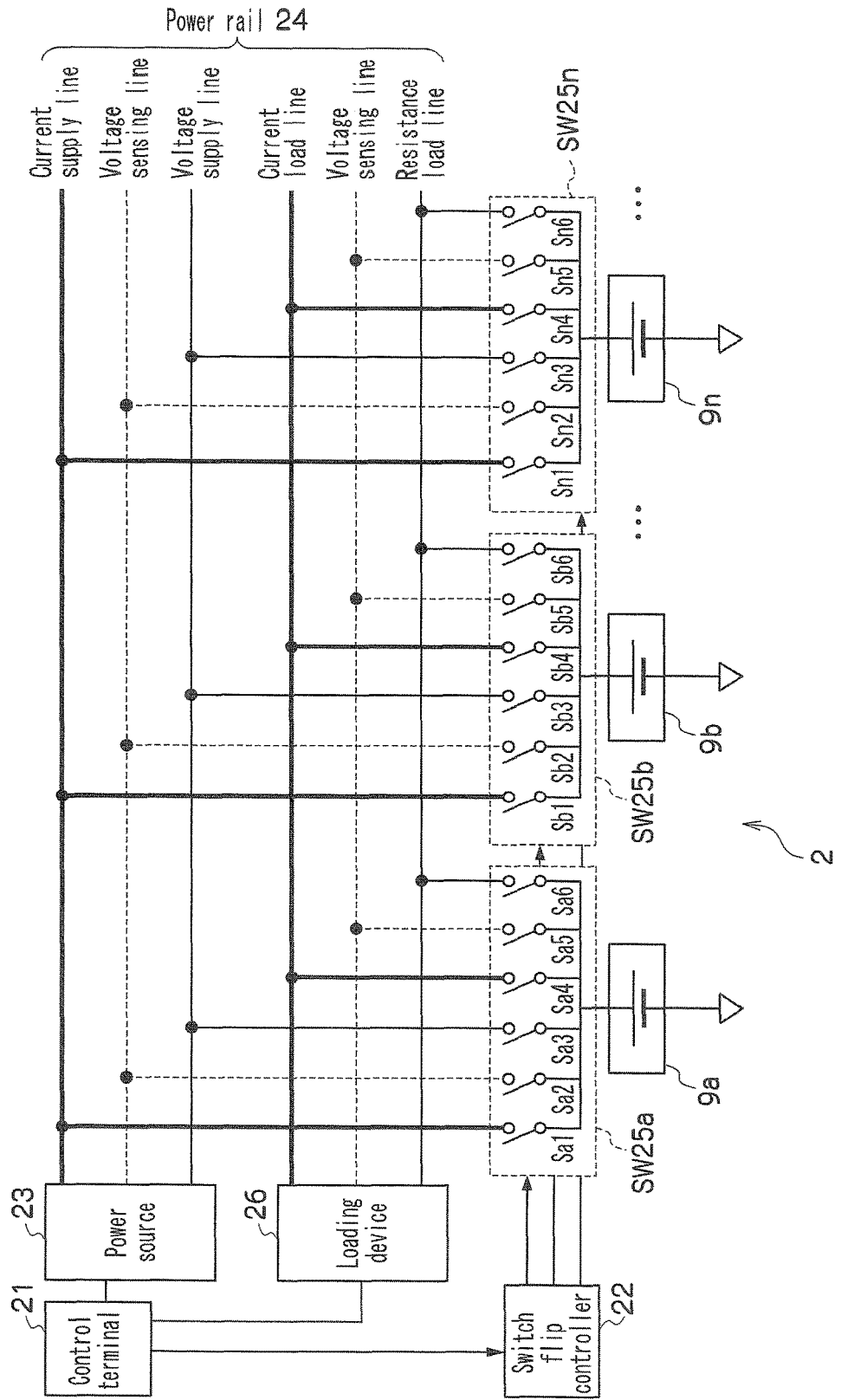
FIG. 14 is a structural view illustrating a structure of a charge/discharge testing device of a second embodiment.

FIG. 14 is a structural view illustrating a structure of a charge/discharge testing device of the second embodiment. In FIG. 14, a charge/discharge testing device 2 of the second embodiment includes a control terminal 21, a switch flip controller 22, a power source 23, a power rail 24, switch portions SW25a to SW25n, and a loading device 26.

The charge/discharge testing device 2 performs charge/discharge test operation on a plurality of quantum cells 9 (9a to 9n). The number of test objects for the charge/discharge test is not specifically limited. The present embodiment exemplifies a case that the charge/discharge testing device 2 performs the charge/discharge test on the quantum cells 9a to 9n concurrently in parallel.

The power source 23 charges the quantum cells 9a to 9n. The power source 23 is connected to the control terminal 21 and charges the quantum cells 9a to 9n via the power rail 24 under control of the control terminal 21.

Figure 15A:
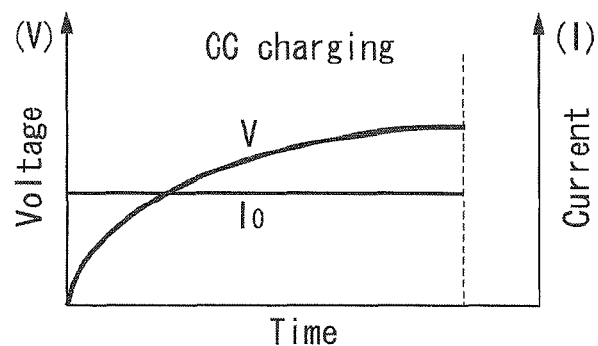
FIG. 15 is an explanatory view illustrating a CC-CV charging method and a CC charging method.
Figure 15B:
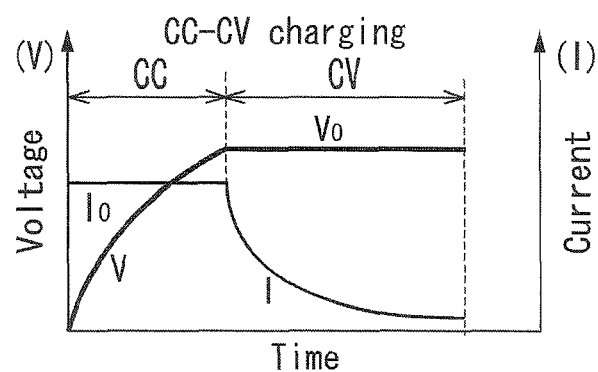

For example, any of a CC charging method, a CC-CV charging method, a CV charging method, and the like may be adopted as the charging method of the power source 23. Here, it is also possible to switch an operational mode of the charging method. Naturally, the charging method of the power source 23 is not specifically limited. A variety of existing charging method or extended method thereof may be widely adopted. For example, in the CC charging method, as illustrated in FIG. 15(A), a voltage is heightened with time while a current value supplied to the quantum cells 9 is kept constant and charging is performed until a predetermined time passes. Further, for example, in the CC-CV charging method, as illustrated in FIG. 15(B), a voltage is heightened with a current value kept constant, the voltage is kept constant at a certain voltage value after arriving thereat, and charging is performed for a predetermined time or until a current value becomes to a certain value or less.

The loading device 26 may adopt a current source, a slide resistor, an electronic loading circuit, or the like to absorb electric power from the discharging quantum cells 9a to 9n via the power rail 24.

Further, the loading device 26 has a regeneration function to absorb electric power discharged by the quantum cells 9 via a current load line and to regenerate the discharged electric power to the power source 23.

As illustrated in FIG. 14, all the quantum cells 9 being the test objects are connected to the current load line and a resistance load line. The loading device 26 can absorb a direct current output by any of the quantum cells 9 via the current load line and regenerate the discharged electric power using the direct current. That is, for regenerating the discharged electric power in the charge/discharge testing device 2, the discharged electric power can be transferred among the plurality of quantum cells 9 being the test objects.

For example, conventionally, in some charge/discharge testing devices which perform charge/discharge test on two test objects (e.g., lithium ion secondary cells) concurrently in parallel, discharged electric power is transferred within a pair being the two test objects. In contrast, in the charge/discharge testing device 2 of the present embodiment, the discharged electric power can be transferred among all the quantum cells 9 via the current load line not between specific quantum cells.

Further, since the loading device 26 can regenerate a direct current output by the quantum cells 9 as it is, it is not required to arrange an inverter for converting into an alternate current required for a conventional charge/discharge testing device.

Figure 16A:
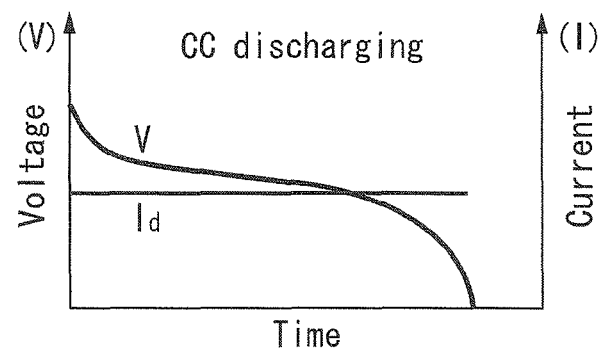
FIG. 16 is an explanatory view illustrating a CC discharging method and an R discharging method.
Figure 16B:
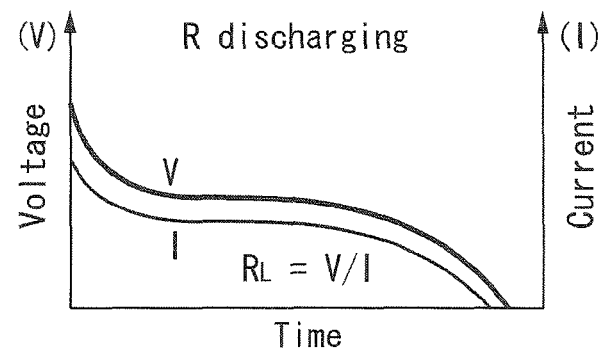

Here, a variety of existing discharging methods may be widely adopted as a discharging method of the loading device 26. For example, it is possible to adopt a CC discharging method, an R discharging method, or the like. It is also possible to switch an operational mode of the discharging method. In the CC discharging method, as illustrated in FIG. 16(A), discharging is completed when the voltage becomes to have a value or lower while the current value discharged from the quantum cell 9 is kept constant. In the R discharging method, as illustrated in FIG. 16(B), electric power is absorbed from the quantum cell 9 while the resistance value of the loading device 26 is kept constant.

The power rail 24 is a bundle of a plurality of power lines to which the power source 23 and the loading device 26 are connected. The power rail 24 includes a current supply line, a voltage sensing line at the supply side, and a voltage supply line which are connected to the power source 23. The power rail 24 also includes a current load line, a voltage sensing line at the load side, and a resistance load line which are connected to the loading device 26.

The current supply line and the voltage supply line are power lines for charging to supply voltages to the quantum cells 9 from the power source 23 for charge operation. The current load line and the resistance load line are power lines for discharging to supply discharge electric power discharged from the quantum cells 9 to the loading device 26.

The voltage sensing line at the supply side and the voltage sensing line at the load side are power lines for detecting voltages at contacting points with the quantum cells 9.

The switch portions SW25a to SW25n are arranged between the power lines structuring the power rail 24 and the quantum cells 9a to 9n being the test objects, so that switch flipping is performed under control of the switch flip controller 22. Each of the switch portions SW25a to SW25n includes six switches. For example, switches arranged in the switch portion SW25a are indicated as switches Sa1 to Sa6.

The control terminal 21 controls operation of the charge/discharge test. The control terminal 21 performs setting of a test operation, instructing of switch flip for the switch flip controller 22, displaying of test results of the charge/discharge test, and the like. Here, similarly to the first embodiment, a personal computer may be adopted as the control terminal 21. In a case that the charging/discharging device 2 is formed into a device of a single unit, the control terminal 21 may be a control unit as a component of the charging/discharging device 2.

Figure 17:
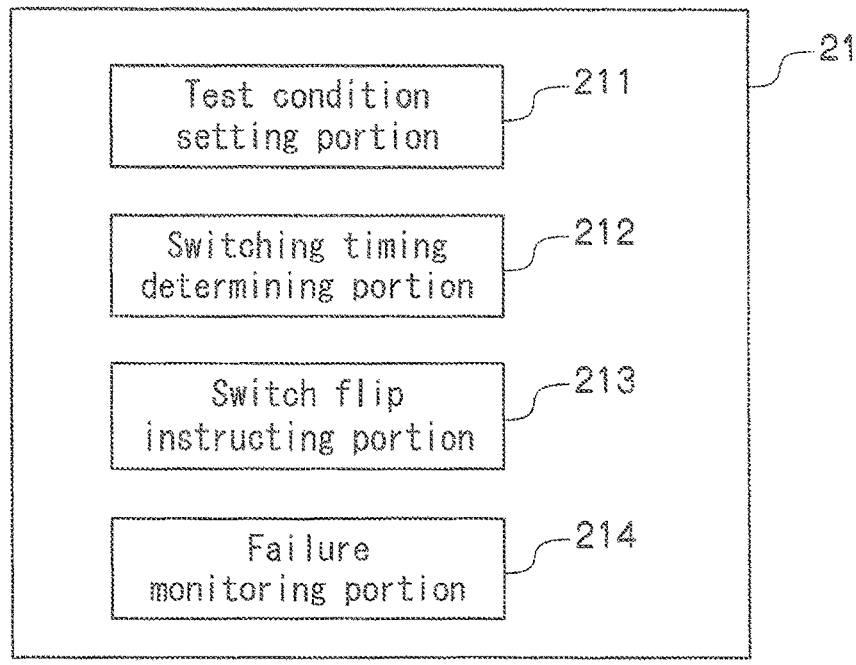
FIG. 17 is a functional block diagram illustrating control functions of charge/discharge operation actualized by a control terminal of the second embodiment.

FIG. 17 is a functional block diagram illustrating control functions of charge/discharge operation actualized by the control terminal 21. In FIG. 17, the control terminal 21 mainly includes a test condition setting portion 211, a switching timing determining portion 212, a switch flip instructing portion 213, and a failure monitoring portion 214.

The test condition setting portion 211 sets test conditions for the charge/discharge test operation based on a user operation.

Here, examples of the test conditions include setting of a charging method and a discharging method, setting of a voltage value, a current value, and the like for the charge/discharge test, setting of a charging time and a discharging time for the charge/discharge test, and the number of test objects.

The switching timing determining portion 212 determines switching timing of the switches which are flipped by the switch flip controller 22 based on the operational conditions set by the test condition setting portion 211.

The switching timing of the switches is determined by the switching timing determining portion 212 so that charge operation and discharge operation of the quantum cell 9 being the test object are performed at timing temporally different from timing of charge operation and discharge operation of other quantum cells 9.

The switch flip instructing portion 213 provides an instruction of switch flipping to the switch flip controller 22 based on the switching timing determined by the switching timing determining portion 212.

Similarly to the first embodiment, the failure monitoring portion 214 monitors presence or absence of a failure such as a malfunction of the quantum cell 9 as monitoring voltages via the voltage sensing line at the supply side and the voltage sensing line at the load side. In a case that a failure occurs, the failure monitoring portion 214 causes all the switch portions SW25 which are connected to the failed quantum cell 9 to be flipped off. Thus, the failed quantum cell 9 can be disconnected from the power rail 24.

(C-2) Operation of Second Embodiment

Next, the charge/discharge test operation of the quantum cell 9 to be performed by the charge/discharge testing device 2 of the second embodiment will be described in detail with reference to the drawings.

Figure 18:
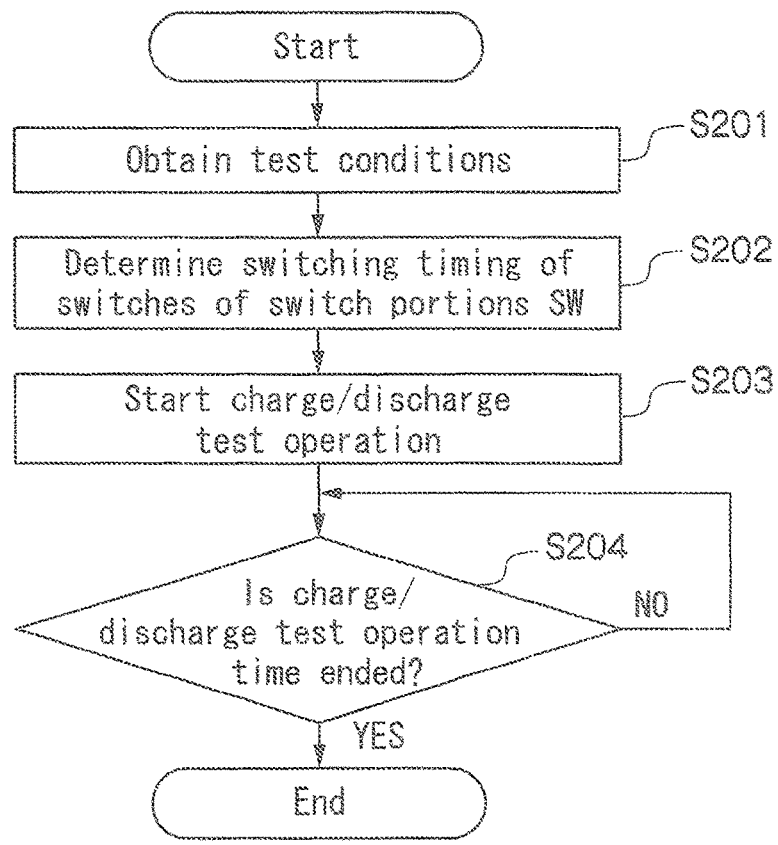
FIG. 18 is a flowchart illustrating operation of a charge/discharge test process on a quantum cell to be performed by the charge/discharge testing device of the second embodiment.

FIG. 18 is a flowchart illustrating the operation of the charge/discharge test process on the quantum cell 9 to be performed by the charge/discharge testing device 2 of the second embodiment.

First, the quantum cells 9 being test objects are connected to connection terminals of the corresponding switch portions SW15 in the charge/discharge testing device 2.

For performing the charge/discharge test of the quantum cells 9, a user inputs test conditions as operating the control terminal 21. In the control terminal 21, the test condition setting portion 211 sets the input test conditions (S201).

The test conditions include setting of the charging method and the discharging method. The present embodiment exemplifies a case to set the CC-CV charging method and the CC-discharging method. Naturally, not limited to the CC-CV charging method and the CC-discharging method, it is also possible to widely adopt a charging method and a discharging method used for another charge/discharge test as in a case of adopting, for example, the CC charging method and the R discharging method, or the like. Further, a constant current set value and a constant voltage set value are set as the test conditions.

Here, the starting order of the charge/discharge test of the quantum cells 9 may be determined in advance or may be determined with user's operation. In the present embodiment, for the sake of explanatory convenience, the charge/discharge test is to be performed in the order of a quantum cell 9*a*, a quantum cell 9*b*, a quantum cell 9*c*, . . . .

Further, as the test conditions, an operational mode of the charge/discharge test is set. Here, the operational mode of the charge/discharge test includes a charging/discharging synchronization mode and a charging/discharging non-synchronization mode.

In the charging/discharging synchronization mode, the charge/discharge operation of a certain quantum cell 9 is completed as performing discharge operation after charge operation is completed, while charge operation of another quantum cell 9 is started when the charge operation of the abovementioned quantum cell 9 is completed.

In the charging/discharging non-synchronization mode, the charging time and the discharging time are determined in advance. Here, when the charging time for a certain quantum cell 9 passes, discharging of the quantum cell 9 is performed and charge operation of another quantum cell 9 is started. In the charging/discharging non-synchronization mode, it is required to set the charging time and the discharging time. Here, it is preferable that the charging time and the discharging time are the same in length. However, since self-discharging occurs when being switched to the discharge operation after the charge operation, it is considered that slight difference between the charging time and the discharging time does not influence to the test results.

In the charge/discharge test operation of the present embodiment, charging (or discharging) of one quantum cell 9 and charging (or discharging) of another quantum cell are performed at different timing. As described above, the charging/discharging synchronization mode and the charging/discharging non-synchronization mode are exemplified as the operational mode of the present embodiment. However, the operational mode is not limited to the above as long as charging (or discharging) of a plurality of quantum cells 9 is performed at different timing.

In the control terminal 21, the switching timing determining portion 212 determines switching timing of switches of the switch portions SW25*a* to SW25*n* based on the setting of the test conditions (S202). Subsequently, in the charge/discharge testing device 2, when the charge/discharge test is started (S203), the switch flip instructing portion 213 provides an instruction of switch flipping to the switch flip controller 22. Then, the charge/discharge test is performed until the charge/discharge test is completed on all the quantum cells 9 (S204).

Figure 19A:
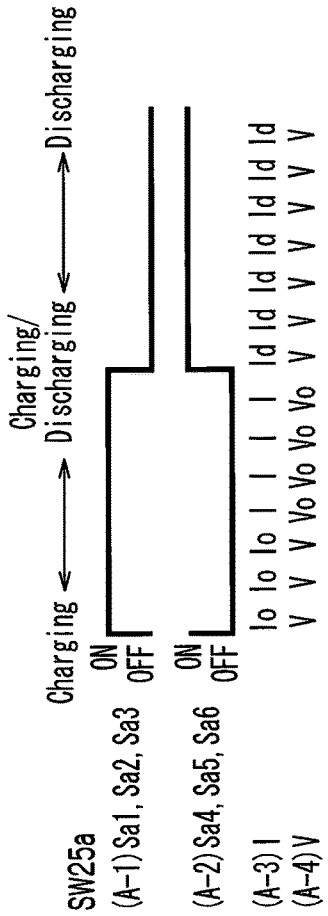
FIG. 19 is an explanatory view illustrating switching timing of switch portions of the second embodiment.
Figure 19B:
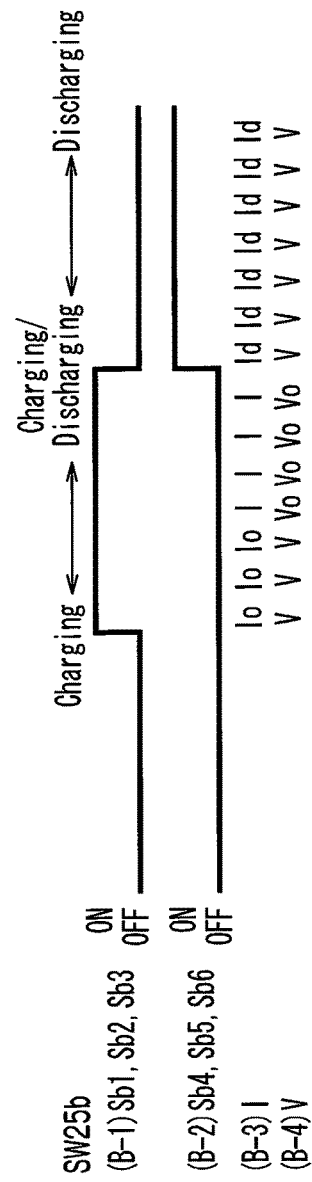
Figure 19C:
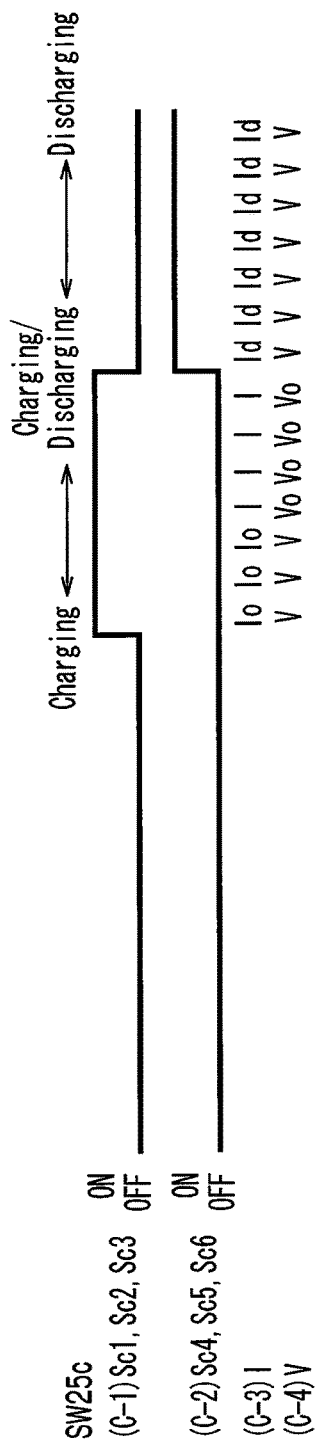

FIG. 19 is an explanatory view illustrating switching timing of the switch portions SW25*a* to SW25*c*. FIG. 19 illustrates an example in which the CC-CV charging method and the CC discharging method are adopted as the charging/discharging method and the charging/discharging non-synchronization mode is adopted as the operational mode.

In FIG. 19, since the CC-CV charging method is adopted as the charging method, the voltage is heightened with a constant current set value $I_0$, and when the voltage reaches a constant voltage set value $V_0$, charging is performed for a predetermined time with the voltage kept at constant. For example, when charge operation is performed on the quantum cell 9*a*, switches S*a*1, S*a*2, S*a*3 of the switch portion SW25*a* are flipped on and the remaining switches thereof are kept off.

Subsequently, when the charge operation of the quantum cell 9*a* is completed, the quantum cell 9*a* is switched to perform the discharge operation of the CC discharging method while a quantum cell 9*b* being the next test object is switched to perform the charge operation. The constant current set value of the CC discharging method is denoted as $I_d$. At that time, the switches S*a*1, S*a*2, S*a*3 of the switch portion SW25*a* for the quantum cell 9*a* are flipped off and switches S*a*4, S*a*5, S*a*6 thereof are flipped on. Further, switches S*b*1, S*b*2, S*b*3 of the switch portion SW25*b* for the quantum cell 9*b* are flipped on and the remaining switches thereof are kept off.

Thus, the charge/discharge operation is performed at different timing such that, when the charge operation of a certain quantum cell 9*a* is completed, the charge operation of another quantum cell 9*b* is started. Accordingly, even though the charge/discharge testing device 2 is not provided with a high current supply capacity, the charge/discharge test can be performed on the plurality of quantum cells 9 concurrently in parallel.

FIG. 20 includes views for comparing the charge operation with the charge/discharge testing device 2 of the second embodiment to conventional charge operation. FIG. 20 exemplifies a case of the charge operation. Similar results can be obtained in a case of the discharge operation.

FIG. 20(A) illustrates currents supplied to quantum cells in a conventional case of charging the plurality of quantum cells concurrently in parallel. FIG. 20(B) illustrates currents supplied to quantum cells in a case that the charging/discharging testing device 2 of the second embodiment charges the plurality of quantum cells concurrently in parallel.

In the conventional case in FIG. 20(A), a charge/discharge testing device is required to have a current supply capacity of $N \times I_0$ for charging N pieces of quantum cells 9 concurrently in parallel. Here, $I_0$ denotes a constant current set value. In contrast, the charge/discharge testing device 2 of the second embodiment performs charge operation with the operational timing shifted for each quantum cell 9. Accordingly, since the current supplied to the quantum cells 9 is leveled as illustrated in FIG. 20(B), it is not required for the charge/discharge testing device 2 to have a high current supply capacity.

In a case of FIG. 20(A), charging is performed concurrently on all the N pieces of quantum cells 9 and a charging time is denoted as $T_0$. In a case of FIG. 20(B), a charging time is longer than the conventional case. Here, evaluation is performed on the total current supply capacity for charging the N pieces of quantum cells 9. In the conventional case, the N pieces of quantum cells 9 are concurrently charged. The current supply time becomes to $T_0$ and the current supply capacity becomes to $N \times I_0 \times T_0$. In contrast, in a case of the second embodiment, the current supply capacity becomes to $N \times I_0 \times (T_0 - T_a)$ as $T_a$ denoting temporal overlap with the charge operation of another quantum cell 9 in FIG. 20(B). Here, $(T_0 - T_a) \leq T_0$ is satisfied. Accordingly, the total current supply capacity is considered to be similar to that in the conventional case.

Further, in a conventional charge/discharge test for being performed on a plurality of quantum cells 9 concurrently in parallel, it is required that all the quantum cells 9 being test objects are concurrently set to a charge/discharge testing device. In contrast, with the charge/discharge testing device 2 of the second embodiment, since operational timing of the charge/discharge operation is shifted, all the quantum cells 9 are not necessarily set from the beginning of the test. Further, the quantum cell 9 after completion of the test therefor can be detached, so that flexibility of testing in parallel is improved. That is, the charge/discharge testing device 2 of the second embodiment is advantageous for continuously manufacturing quantum cells 9.

Here, similarly to the first embodiment, the failure monitoring portion 214 of the control terminal 21 monitors whether or not a failure such as a malfunction occurs at the quantum cells 9. When a failure occurs, the failure monitoring portion 214 discontinues all connections in the switch portion SW25 to which the quantum cell 9 is connected to disconnect the quantum cell 9 from the power rail 24.

(C-3) Regeneration Operation of Charge/Discharge Testing Device 2

Next, description will be provided on operation of the charge/discharge testing device 2 according to the second embodiment to regenerate electric power discharged from the quantum cell 9.

Figure 24:
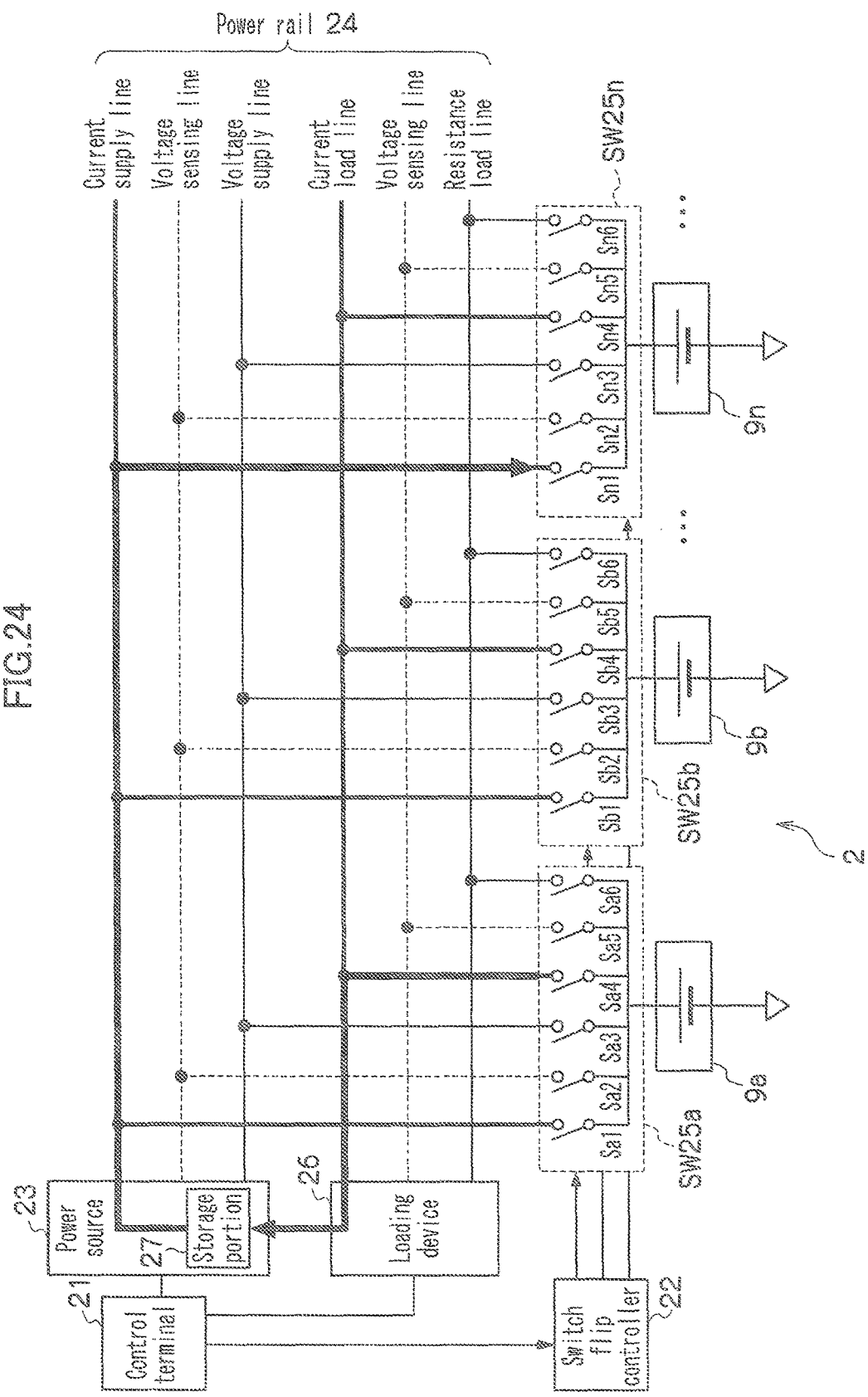
FIG. 24 is an explanatory view illustrating regeneration operation of electric power discharged from a quantum cell in the charge/discharge testing device of the second embodiment.

FIG. 24 is an explanatory view illustrating regeneration operation of electric power discharged from the quantum cell 9 in the charge/discharge testing device 2 of the second embodiment.

In FIG. 24, the charge/discharge testing device 2 of the second embodiment includes a storage portion 27 which stores electric power discharged from the quantum cell 9. A variety of elements or devices, such as a capacitor and a storage cell, can be adopted as the storage portion 27 as long as being capable of storing electric power. Further, the storage portion 27 may be mounted in the power source 23 or separately arranged between the loading device 26 and the power source 23, as long as being capable of storing regenerated electric power flowing from the quantum cell 9 to the loading device 26.

As illustrated in FIG. 24, discharged electric power (discharged current) from the quantum cell 9 flows to the loading device 26 through the current load line and the resistance load line. Charges flown to the loading device 26 are temporarily stored at the storage portion 27. The power source 23 uses the regenerated electric power stored at the storage portion 27 as a part of charge electric power. Thus, the discharged electric power from the quantum cell 9 can be transferred among the quantum cells 9, so that an electricity amount of the power source 23 can be reduced.

Here, since the discharged electric power from the quantum cell 9 to the loading device 26 is direct-current electric power, it is not required to arrange a power conversion device (e.g., an inverter, or the like) to convert alternate-current electric power to direct-current electric power. Since the discharged electric power from the quantum cell 9 is direct-current electric power and power conversion from alternate-current electric power to direct-current electric power is not required, the discharged electric power from the quantum cell 9 can be continuously used as regeneration electric power. Charge electric power is supplied from the power source 23 to each quantum cell 9 under switching control of the switch portions SW25a to SW25n. Here, the power source 23 can regenerate the discharged (direct current) electric power from the quantum cell 9 stored at the storage portion 27 as a part of charge electric power for another quantum cell 9 approximately at the same timing without performing power conversion. Thus, the power source 23 can regenerate discharged electric power from a certain quantum cell 9 as a part of charge electric power for another quantum cell 9 approximately at the same timing.

Further, the power source 23 may adjust charge electric power value so that regenerated electric power of the storage portion 27 is preferentially used. For example, the power source 23 may evaluate an electric power value of the storage portion 27 and set an electric power value being a difference between an electric power value required for charging the quantum cell 9 and the electric power value of the storage portion 27 as a charge electric power value. According to the above, an electricity amount of the power source 23 can be effectively reduced while regenerated electric power can be effectively used.

(C-4) Modified Embodiment of Second Embodiment

Figure 25:
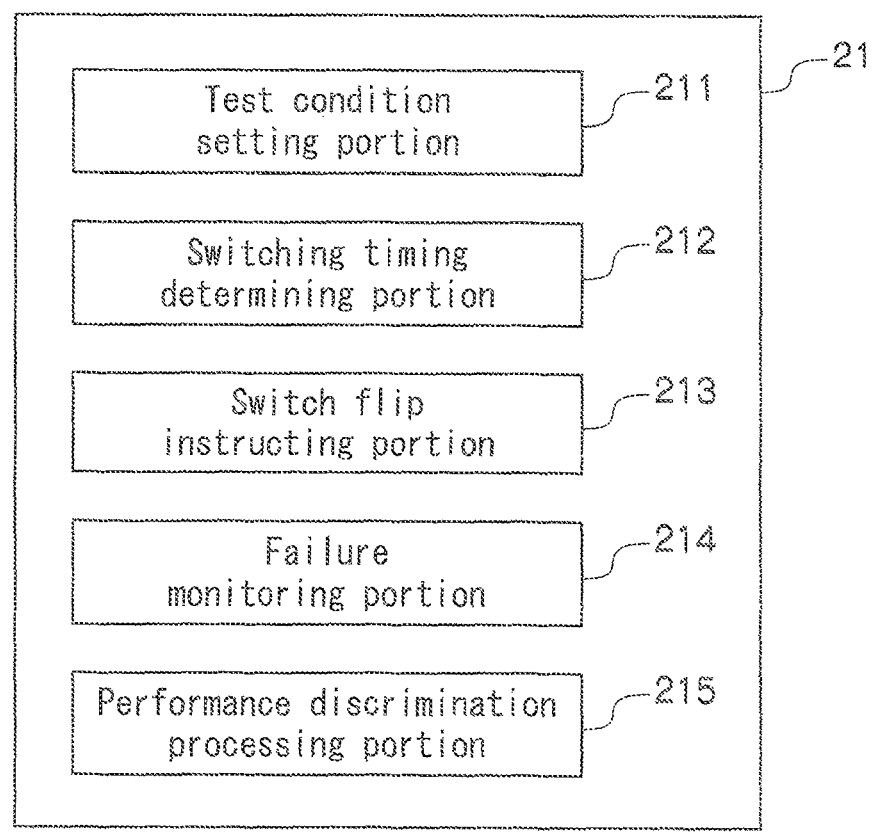
FIG. 25 is a functional block diagram illustrating control functions of a control terminal of a modified embodiment of the second embodiment.

FIG. 25 is a functional block diagram illustrating control functions of the control terminal 21 of a modified embodiment of the second embodiment.

As illustrated in FIG. 25, the control terminal 21 of the modified embodiment of the second embodiment includes a performance discrimination processing portion 215 in addition to the test condition setting portion 211, the switching timing determining portion 212, the switch flip instructing portion 213, and the failure monitoring portion 214 which are mentioned above.

The control terminal 21 of the modified embodiment stores test conditions for a charge/discharge test of the respective quantum cells 9 and test results of the respective quantum cells 9. Specifically, for example, the control terminal 21 stores charge/discharge test conditions such as a charging method, a discharging method, a set voltage value and a set current value of the power source 23, a charging time for each quantum cell 9, a discharging time for each quantum cell 9, and switching timings of charge operation and discharge operation as well as test data such as measurement data (voltage values, current values, and electric power) in charging of each quantum cell 9 being a test object and measurement data (voltage values, current values, and electric power) in discharging thereof.

The control terminal 21 may sequentially record, as the test data, values via voltage sensing line in the power rail 24 (or may be a line capable of measuring a current value although FIG. 24 illustrates a voltage sensing line) for charge operation and a voltage sensing line therein (or may be a line capable of measuring a current value although FIG. 24 illustrates a voltage sensing line) for discharge operation. Alternately, the control terminal 21 may record values sampled for each predetermined sampling time. According to the above, the control terminal 21 can store measurement data over the charging time and measurement data over the discharging time of the respective quantum cells 9.

The performance discrimination processing portion 215 analyzes charge characteristics and discharge characteristics of the respective quantum cells 9 based on the test results of all the charge/discharge-tested quantum cells 9 and performs discrimination in accordance with performance of the quantum cells 9 using the charge characteristics and the discharge characteristics. The charge characteristics and the discharge characteristics may be obtained with the method described in the first embodiment. The performance discrimination processing portion 215 may use measurement data of either or both of the charge characteristics and the discharge characteristics. For example, it is also possible to perform discrimination on the charge/discharge-tested quantum cells 9 into a plurality of groups by comparing the measurement data being the charge characteristics (or the discharge characteristics) to one or a plurality of threshold values. Owing to such grouping, the quantum cells 9 may be discriminated in accordance with performance of the charge/discharge characteristics.

(C-5) Effects of Second Embodiment

As described above, according to the second embodiment, since electric power can be supplied to quantum cells from a power rail via switch portions, a circuit required for one quantum cell can be structured inexpensively.

Further, according to the second embodiment, electric power is supplied to a plurality of quantum cells concurrently in parallel in a temporally-divided manner, the current supply capacity from the power source can be appropriately leveled.

Further, according to the second embodiment, since temporally-divided power supply from the power rail can be controlled in timing due to ON/OFF of the switch portions performed by the control terminal such as a PC, the number of quantum cells to be operated concurrently in parallel can be increased or decreased easily.

Further, according to the second embodiment, concurrent power supply to a number of quantum cells in parallel is performed individually from the power rail via the switch portions. Therefore, even when a failure such as a malfunction occurs at a certain quantum cell, operation can be continued without causing a problem at other quantum cells simply by disconnecting the failed quantum cell by causing the switch portion to be OFF with control of the control terminal such as a PC.

According to the second embodiment, since the charge/discharge operation is temporally shifted among a plurality of quantum cells, flexibility of testing in parallel is improved.

Further, according to the second embodiment, power of a current power source to be discharge load can be continuously regenerated.

(D) Other Embodiments (D-1) In the abovementioned first and second embodiments, description is provided as an example on a case that a plurality of secondary cells are connected, in parallel, to the power rail being the power line group and electric power is supplied and consumed as temporally switching the switching portions. However, the present invention can be applied to a structure described below.

For example, as a first group denoting a plurality of secondary cells connected to the power line group (power rail) as having the same polarities, a plurality of secondary cells being a second group having polarities opposite to those of the first group may be connected to the power line group (power rail) instead of the first group.

Further, for example, it is also possible that the first groups are connected, in parallel, to the power line group (power rail) and switching control of the switch portions is performed for each group. Further, for example, it is also possible that the second groups are connected, in parallel, to the power line group (power rail) and switching control of the switch portions is performed for each group. Further, for example, it is also possible that one or a plurality of the first groups and one or a plurality of the second groups are serial-connected or parallel-connected to the power line group (power rail) and switching control of the switch portions is performed for each group.

In a case with the connection structure exemplified above, the switching control of the switch portions can be performed for each group. Then, the power source performs power supplying or power consuming at the same timing. Here, the power source may have a current supply capacity corresponding to the number of secondary cells to be connected at the same timing. Thus, the current supply capacity of the power source can be suppressed compared to the related art in which a plurality of secondary cells are concurrently charged and discharged.

(D-2) In the abovementioned second embodiment, description is provided on a case of adopting the CC-CV charging method and the CC discharging method. However, the combination of a charging method and a discharging method is not limited to the above. For example, another combination such as the CC charging method and the R discharging method can be adopted as long as overlapping of supply current of the power source or the loading device can be suppressed.

(D-3) The present invention can be widely applied to a device which performs testing, evaluating, examining, and the like on a plurality of quantum cells 9 while causing the quantum cells 9 to perform charge/discharge operation concurrently in parallel. For example, the present invention can be applied to a conditioning device, a charge/discharge testing device, an aging testing device, a charge/discharge cycle testing device to evaluate characteristic deterioration of a quantum cell 9 with charge operation and discharge operation of the quantum cell 9 repeatedly performed, and the like. According to the present invention, it is possible to perform switching of an operational mode of evaluation of quantum cells 9 in conditioning, charge/discharge testing, aging testing, or charge/discharge cycle testing. Further, it is possible to discriminate a failed quantum cell 9 detected in each evaluation stage and to discriminate a quantum cell 9 based on performance of charge characteristics, discharge characteristics and the like. Further, the present invention can be applied to a case of performing testing, evaluating, examining, and the like while only charge operation is performed on a plurality of quantum cells 9 concurrently in parallel or only discharge operation is performed by a plurality of quantum cells 9 concurrently in parallel.

(D-4) Application to Charge/Discharge Cycle Testing Device

As described above, the charging/discharging device of the present invention can be applied to a charge/discharge cycle testing device to evaluate characteristic deterioration of a quantum cell 9. The structure of FIG. 24 described in the second embodiment can be adopted as a structure for applying the charging/discharging device of the present invention to a charge/discharge cycle testing device. In a case that the present invention is applied as a charge/discharge cycle testing device, conditions for charge/discharge cycle testing include the number of cycles of repeating charge operation and discharge operation in addition to the test conditions described in the second embodiment.

According to that the present invention is applied to a charge/discharge cycle testing device, following effects can be obtained in addition to the effects due to the charging/discharging device 2 described in the second embodiment.

Figure 26:
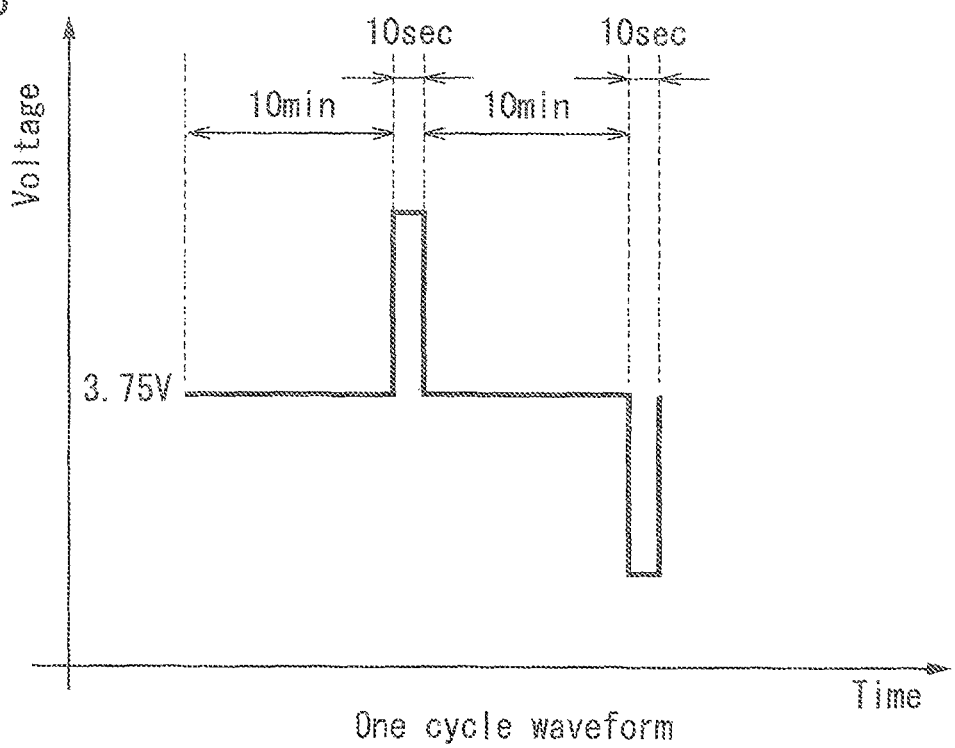
FIG. 26 is a view illustrating a test result (one-cycle waveform) of a charge/discharge cycle test of a lithium ion secondary cell in the related art.

FIG. 26 is a view illustrating a test result (one-cycle waveform) of a charge/discharge cycle test of a lithium ion secondary cell in the related art (a technology disclosed in Patent Document 2). FIG. 26 illustrates an example that each of a charging time and a discharging time is set to ten seconds and a rest time between charging and discharging is set to ten minutes. As illustrated in FIG. 26, in the conventional charge/discharge cycle test of a secondary cell (lithium secondary cell), a charging voltage and a discharging voltage are applied while the center voltage (reference voltage) is set to 3.5 V. In a case of performing charging, since the voltage obtained by adding the charging voltage amount to the center voltage is applied, the current value of the secondary cell becomes large. In a case that a charge/discharge cycle test is performed on a plurality of secondary cells concurrently in parallel, current values of the plurality of secondary cells are overlapped and the current value of the secondary cells are increased in accordance with the number of secondary cells on which the charge/discharge cycle test is performed concurrently in parallel. Accordingly, the power source is required to have an extremely large current supply capacity.

In contrast, in a case that the present invention is applied to a charge/discharge cycle testing device, since charge operation and discharge operation can be performed with switching of the switch portions SW25, the center voltage (reference voltage) can be set to 0 V. Thus, since the charging voltage is applied with reference to 0 V being the center voltage (reference voltage), the current value of a secondary cell 9 can be suppressed compared to the related art. Further, even in a case of performing on a plurality of secondary cells 9 concurrently in parallel, charge operation and discharge operation are repeatedly performed with switching of the switch portions SW25. Therefore, overlapping of the current of the plurality of secondary cells 9 can be avoided or suppressed. Accordingly, it is possible to arrange a power source to have smaller current supply capacity than that in the related art.

DESCRIPTION OF REFERENCES

1 Conditioning device
2 Charge/discharge testing device
11, 21 Control terminal
12, 22 Switch flip controller
13-1 to 13-4, 23 Power source
14, 24 Power rail
15a to 15n, 25a to 25n Switch portion
26 Loading device
9 (9a to 9n) Quantum cell

The invention claimed is:

1. A charging/discharging device which causes a plurality of charge/discharge members to perform, concurrently in parallel, charge operation and discharge operation, comprising: a power unit; a plurality of power lines for charging to provide, to the plurality of charge/discharge members, electric power supplied from the power unit; a plurality of power lines for discharging to provide, to the power unit, electric power discharged from the plurality of charge/discharge members, the power unit applying voltages having a plurality of mutually-different voltage values via the plurality of power lines for charging and the plurality of power lines for discharging; a plurality of connection switching units which switch connection of the plurality of charge/discharge members with the power lines for charging and the power lines for discharging as being interposed respectively between the plurality of charge/discharge members and each of the power lines for charging and the power lines for discharging; and a switching control unit which controls switching of connection of the plurality of connection switching units so that the respective charge/discharge members are connected cyclically in predetermined order to the plurality of power lines for charging and the plurality of power lines for discharging; and wherein the switching control unit switches connection of the plurality of connection switching units at timings defined by dividing one cycle time for cyclic connection with the plurality of power lines for charging and the plurality of power lines for discharging by a total number of the charge/discharge members.

2. The charging/discharging device according to claim 1, wherein the switching control unit controls switching of the plurality of connection switching units so that instant high charge electric power being higher than charge electric power is instantly supplied to the charge/discharge members respectively right before supplying the charge electric power, instant high discharge electric power being higher than discharge electric power is instantly supplied to the charge/discharge members respectively right before supplying the discharge electric power, and the instant high charge electric power and the instant high discharge electric power are not overlapped among the plurality of charge/discharge members.

3. The charging/discharging device according to claim 1, wherein the switching control unit switches connection of the plurality of connection switching units at temporally different timings.

4. The charging/discharging device according to claim 1, further comprising:

a sensing line which detects voltage values of the plurality of charge/discharge members; and
a control unit which detects a failure of each of the charge/discharge members based on the detected voltage values by the sensing line, which specifies a failed charge/discharge member in light of comparison between timing of failure detecting of the charge/discharge member and timing of switching in predetermined order under switching control of the connection switching units due to the switching control unit, and which instructs the switching control unit to disconnect the connection switching unit connected to the failed charge/discharge member.

5. The charging/discharging device according to claim 4, wherein the control unit performs discrimination in accordance with performance of the plurality of charge/discharge members based on charge characteristics and/or discharge characteristics of the plurality of charge/discharge members.

6. The charging/discharging device according to claim 1, wherein the power line group includes a charging voltage sensing line and a discharging voltage sensing line to detect voltage values at contact points with the respective charge/discharge members, the power unit monitors the voltage values at the contact points with the respective charge/discharge members via the charging voltage sensing line and the discharging voltage sensing line and performs voltage adjusting based on the voltage values at the contact points with the respective charge/discharge members.

7. The charging/discharging device according to claim 1, wherein the power line for charging and the power line for discharging through which a large current flows from the power unit is provided with the charging voltage sensing line and the discharging voltage sensing line, and the power line for charging and the power line for discharging through which a small current flows from the power unit is not provided with the charging voltage sensing line and the discharging voltage sensing line.

8. A charging/discharging device which performs, concurrently in parallel, charge operation and discharge operation on a plurality of charge/discharge members, comprising: a power line group including a power line for charging and a power line for discharging connected to a power unit which supplies electric power having a plurality of mutually different values; a plurality of connection switching units which connect the power line group to the respective charge/discharge members for each charge/discharge member; and a switching control unit which controls switching of the plurality of connection switching units so that maximum electric power values of charge electric power supplied to the respective charge/discharge members via the power line for charging and maximum electric power values of discharge electric power supplied to the respective charge/discharge members via the power line for discharging are not temporally overlapped among a part or all of the plurality of charge/discharge members; and wherein the switching control unit controls switching of the plurality of connection switching units cyclically in predetermined order at timings defined by dividing one cycle time of the charge operation and the discharge operation of the plurality of charge/discharge members by a total number of the charge/discharge members.

9. The charging/discharging device according to claim 3, wherein the switching control unit controls switching of the plurality of connection switching units so that instant high charge electric power being higher than charge electric power is instantly supplied to the charge/discharge members respectively right before supplying the charge electric power, instant high discharge electric power being higher than discharge electric power is instantly supplied to the charge/discharge members respectively right before supplying the discharge electric power, and the instant high charge electric power and the instant high discharge electric power are not overlapped among the plurality of charge/discharge members.

10. The charging/discharging device according to claim 3, wherein the switching control unit switches connection of the plurality of connection switching units at temporally different timings.

11. The charging/discharging device according to claim 8, further comprising:

a sensing line which detects voltage values of the plurality of charge/discharge members; and a control unit which detects a failure of each of the charge/discharge members based on the detected voltage values by the sensing line, which specifies a failed charge/discharge member in light of comparison between timing of failure detecting of the charge/discharge member and timing of switching in predetermined order under switching control of the connection switching units due to the switching control unit, and which instructs the switching control unit to disconnect the connection switching unit connected to the failed charge/discharge member.

12. The charging/discharging device according to claim 8, wherein the power line group includes a charging voltage sensing line and a discharging voltage sensing line to detect voltage values at contact points with the respective charge/discharge members, the power unit monitors the voltage values at the contact points with the respective charge/discharge members via the charging voltage sensing line and the discharging voltage sensing line and performs voltage adjusting based on the voltage values at the contact points with the respective charge/discharge members.

13. The charging/discharging device according to claim 8, wherein the power line for charging and the power line for discharging through which a large current flows from the power unit is provided with the charging voltage sensing line and the discharging voltage sensing line, and the power line for charging and the power line for discharging through which a small current flows from the power unit is not provided with the charging voltage sensing line and the discharging voltage sensing line.

14. A charging/discharging device which performs, concurrently in parallel, charge operation and discharge operation on a plurality of charge/discharge members, comprising: a power line group including a power line for charging connected to a power unit and a power line for discharging connected to a loading unit; a plurality of connection switching units which connect the power line group to the respective charge/discharge members for each charge/discharge member; and a switching control unit which controls switching of the plurality of connection switching units so that maximum electric power values of charge electric power supplied to the respective charge/discharge members via the power line for charging and maximum electric power values of discharge electric power from the respective charge/discharge members via the power line for discharging are not temporally overlapped among a part or all of the plurality of charge/discharge members; and wherein the switching control unit controls switching of the plurality of connection switching units cyclically in predetermined order at timings defined by dividing one cycle time of the charge operation and the discharge operation of the plurality of charge/discharge members by a total number of the charge/discharge members.

15. The charging/discharging device according to claim 14, further comprising a storing unit which stores direct-current discharge electric power from the respective charge/discharge members, wherein the power unit regenerates the electric power stored at the storing unit as charge electric power for the respective charge/discharge members.

16. The charging/discharging device according to claim 14,
wherein the switching control unit switches connection of the plurality of connection switching units at temporally different timings.

17. The charging/discharging device according to claim 14, further comprising:
a sensing line which detects voltage values of the plurality of charge/discharge members; and
a control unit which detects a failure of each of the charge/discharge members based on the detected voltage values by the sensing line, which specifies a failed charge/discharge member in light of comparison between timing of failure detecting of the charge/discharge member and timing of switching in predetermined order under switching control of the connection switching units due to the switching control unit, and which instructs the switching control unit to disconnect the connection switching unit connected to the failed charge/discharge member.

18. The charging/discharging device according to claim 14,
wherein the power line group includes a charging voltage sensing line and a discharging voltage sensing line to detect voltage values at contact points with the respective charge/discharge members,
the power unit monitors the voltage values at the contact points with the respective charge/discharge members via the charging voltage sensing line and the discharging voltage sensing line and performs voltage adjusting based on the voltage values at the contact points with the respective charge/discharge members.

19. The charging/discharging device according to claim 14,
wherein the power line for charging and the power line for discharging through which a large current flows from the power unit is provided with the charging voltage sensing line and the discharging voltage sensing line, and
the power line for charging and the power line for discharging through which a small current flows from the power unit is not provided with the charging voltage sensing line and the discharging voltage sensing line.

* * * * *